(12) United States Patent
Mietke et al.

(10) Patent No.: US 11,693,817 B2
(45) Date of Patent: Jul. 4, 2023

(54) INTEGRATED UNIVERSAL FILE CONVERTER

(71) Applicant: SAP SE, Walldorf (DE)

(72) Inventors: Sebastian Mietke, Reilingen (DE); Toni Fabijancic, Eppelheim (DE)

(73) Assignee: SAP SE, Walldorf (DE)

( * ) Notice: Subject to any disclaimer, the term of this patent is extended or adjusted under 35 U.S.C. 154(b) by 121 days.

(21) Appl. No.: 17/039,676

(22) Filed: Sep. 30, 2020

(65) Prior Publication Data
US 2022/0100703 A1 Mar. 31, 2022

Related U.S. Application Data

(63) Continuation of application No. 15/903,800, filed on Feb. 23, 2018, now Pat. No. 10,824,587.

(51) Int. Cl.
| | |
|---|---|
| *G06F 16/17* | (2019.01) |
| *G06F 16/11* | (2019.01) |
| *G06F 16/182* | (2019.01) |
| *G06F 16/178* | (2019.01) |

(52) U.S. Cl.
CPC ........ *G06F 16/116* (2019.01); *G06F 16/1734* (2019.01); *G06F 16/1794* (2019.01); *G06F 16/1824* (2019.01)

(58) Field of Classification Search
CPC ............... G06F 16/116; G06F 16/1824; G06F 16/1794; G06F 16/1734
See application file for complete search history.

(56) References Cited

U.S. PATENT DOCUMENTS

| | | | | |
|---|---|---|---|---|
| 5,845,415 A | * | 12/1998 | Sundqvist | D21F 5/187 34/463 |
| 5,848,415 A | | 12/1998 | Guck | |
| 6,094,684 A | * | 7/2000 | Pallmann | G06F 9/54 709/227 |

(Continued)

FOREIGN PATENT DOCUMENTS

WO WO2013062599 A1 * 5/2013

OTHER PUBLICATIONS

Quick Fuzz: an Automatic Random Fuzzer for Common File Format; Greico et al., ACM 2016.*

(Continued)

*Primary Examiner* — Daniel A Kuddus
(74) *Attorney, Agent, or Firm* — Klarquist Sparkman, LLP

(57) ABSTRACT

Universal, automatic file conversion may be provided by a universal file conversion system or application. An input file may be received by the universal file conversion system. An input file type for the input file and a recipient of the input file may be determined. Programs available to the recipient for accessing a file may be determined. A target file type accessible to the recipient may be determined for converting the input file. A sequence of file conversions to convert the input file to the target file type may be determined. The input file may be converted to the target file type based on the sequence of file conversions. The converted file may be provided to the recipient. The recipient may return the converted file, and the converted file may be automatically converted back to the original input file type and provided to the original source of the input file.

20 Claims, 14 Drawing Sheets

(56) References Cited

U.S. PATENT DOCUMENTS

| | | | | |
|---|---|---|---|---|
| 7,058,641 | B1* | 6/2006 | Franz | G06Q 10/107 |
| | | | | 707/999.102 |
| 7,263,561 | B1* | 8/2007 | Green | G06F 21/56 |
| | | | | 709/206 |
| 7,424,543 | B2* | 9/2008 | Rice, III | G06F 16/182 |
| | | | | 715/744 |
| 7,490,079 | B2* | 2/2009 | Shipp | G06F 16/2228 |
| | | | | 707/999.102 |
| 7,640,361 | B1* | 12/2009 | Green | H04L 63/145 |
| | | | | 715/205 |
| 9,098,472 | B2* | 8/2015 | Bach | G06F 16/168 |
| 9,361,473 | B2* | 6/2016 | Chou Fritz | H04L 63/04 |
| 9,569,441 | B2* | 2/2017 | Fabijancic | G06F 16/113 |
| 9,639,538 | B2* | 5/2017 | Fabijancic | G06F 16/113 |
| 9,912,625 | B2* | 3/2018 | Mutha | H04L 67/02 |
| 10,025,948 | B1* | 7/2018 | Chou Fritz | G06F 3/0481 |
| 10,868,855 | B2* | 12/2020 | Achyuth | G06F 21/604 |
| 10,909,256 | B1* | 2/2021 | Fritz | G06F 3/04842 |
| 11,210,610 | B2* | 12/2021 | Lockhart | G06F 40/106 |
| 2002/0174010 | A1* | 11/2002 | Rice, III | G06F 16/182 |
| | | | | 705/14.67 |
| 2004/0030995 | A1 | 2/2004 | Bhogal | G06F 16/116 |
| | | | | 707/E17.121 |
| 2006/0224632 | A1* | 10/2006 | Franz | G06Q 10/107 |
| 2010/0211583 | A1* | 8/2010 | Basso | G06F 16/116 |
| | | | | 707/756 |
| 2010/0241651 | A1* | 9/2010 | Xiong | G06Q 10/06 |
| | | | | 707/703 |
| 2010/0257179 | A1* | 10/2010 | Arrouye | G06F 16/168 |
| | | | | 707/812 |
| 2012/0150877 | A1* | 6/2012 | Ramamurthy | G06F 16/20 |
| | | | | 707/E17.104 |
| 2013/0110854 | A1* | 5/2013 | Lockhart | G06F 16/1794 |
| | | | | 707/756 |
| 2013/0111326 | A1* | 5/2013 | Lockhart | G06F 16/7837 |
| | | | | 715/234 |
| 2014/0136791 | A1* | 5/2014 | Fabijancic | G06F 16/24552 |
| | | | | 711/134 |
| 2014/0215568 | A1* | 7/2014 | Kirigin | H04L 63/06 |
| | | | | 726/4 |
| 2014/0351229 | A1* | 11/2014 | Gupta | G06F 16/1744 |
| | | | | 707/693 |
| 2015/0006489 | A1 | 1/2015 | Fabijancic et al. | |
| 2015/0039585 | A1 | 2/2015 | Fabijancic | |
| 2015/0100553 | A1 | 4/2015 | Fabijancic et al. | |
| 2015/0199533 | A1* | 7/2015 | Chou Fritz | G06F 21/6209 |
| | | | | 715/781 |
| 2016/0253404 | A1 | 9/2016 | Fabijancic | |
| 2016/0364301 | A1* | 12/2016 | Alatorre | G06F 11/1464 |
| 2017/0041296 | A1* | 2/2017 | Ford | G06F 21/64 |
| 2017/0048172 | A1* | 2/2017 | Chavez | H04L 51/066 |
| 2018/0189245 | A1* | 7/2018 | Ghafourifar | G06F 16/907 |
| 2018/0218155 | A1* | 8/2018 | Grafi | G06F 21/565 |
| 2019/0311118 | A1* | 10/2019 | Grafi | G06F 21/564 |

OTHER PUBLICATIONS

"Content conversion," available at: https://technet.microsoft.com/en-us/library/bb232174(d=printer,v=exchg.160).aspx, 8 pages (Aug. 24, 2017).

* cited by examiner

INTEGRATED UNIVERSAL FILE CONVERTER

CROSS REFERENCE TO RELATED APPLICATIONS

This is a continuation of U.S. patent application Ser. No. 15/903,800, filed on Feb. 23, 2018, now U.S. Pat. No. 10,824,587, which is hereby incorporated herein by reference.

FIELD

The present disclosure generally relates to file conversion, and applications or systems that perform automatic file conversion. Particular implementations relate to automatically converting files exchanged between systems that have different programs for accessing the files, and automatic reconversion of converted files when returned. Further implementations relate to integrating the file conversion system into existing file exchange systems.

BACKGROUND

Files of different types may be transferred from one computer to another, such as by sending them as attachment of an email Upon receipt of such a file, an adequate program is required to open the file and access the contained data accordingly. However, an adequate program is not always available, or available programs are not fully compatible with the file type received. In such cases, an adequate program, or other document or file viewer, must be installed by a user, or the file must be manually converted by a user. This results in delay in accessing the file and extra effort by the user. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Universal, automatic file conversion may be provided by a universal file conversion system or application. An input file may be received by the universal file conversion system. An input file type for the input file and a recipient of the input file may be determined.

Programs available to the recipient for accessing a file may be determined. A target file type accessible to the recipient may be determined for converting the input file. A sequence of file conversions to convert the input file to the target file type may be determined. The input file may be converted to the target file type based on the sequence of file conversions. The converted file may be provided to the recipient.

The recipient may return the converted file, and the converted file may be automatically converted back to the original input file type and provided to the original source of the input file. Machine learning techniques may be used to train and enhance the performance of the universal file conversion system, such as to refine the determination of sequences of file conversions. Simplified conversions that include converting only portions of a file may be used as delta file conversion techniques.

Techniques and solutions are described for data file conversions in a universal file conversion system. According to one method, an input file may be received. An original file type of the input file may be determined. The original file type may be stored in metadata for the input file. A recipient for the input file may be identified.

One or more available programs of the recipient for opening the input file may be identified. A target file type based on at least one of the available programs of the recipient may be determined. A sequence of a first set of file conversions to convert the input file from the original file type to the target file type may be determined. The sequence of file conversions may include one or more file conversions to one or more file types and an order to perform the one or more file conversions and have a final file conversion in the order which converts to the target file type. The sequence of file conversions may be stored in the metadata for the input file.

The plurality of file conversions may be performed based on the order of file conversions from the sequence of file conversions to convert the input file from the original file type to the target file type. The metadata of the input file may be maintained in the converted file. The converted file may be provided to the recipient.

The converted file may be received. The stored original file type may be retrieved from the metadata of the converted file. The stored sequence of file conversions may be retrieved from the metadata for the converted file. A second set of one or more file conversions may be performed to convert the converted file from the target file type to the original file type based on the stored sequence of file conversions or the stored original file type. An updated file in the original file type may be provided.

In an additional process for data file conversion, an input file may be received. An original file type of an input file may be determined. A recipient of an input file may be identified. One or more available programs of a recipient that may open the input file may be identified. A target file type based on at least one of the available programs of the recipient may be determined.

A sequence of file conversions to convert the input file from the original file type to the target file type may be determined via trained logic for determining a sequence of file conversions based on available conversion routines with the input file type and the target file type. The trained logic may be retrained based on the determined sequence of file conversions. The sequence of file conversions may be performed in order of the sequence to convert the input file from the original file type to the target file type. The converted file may be provided to the recipient.

In a further process for data file conversion, an input file may be received. An original file type of the input file may be determined. A recipient for the input file may be identified. One or more available programs of the recipient for opening an input file may be identified. A target file type based on at least one of the available programs of the recipient may be determined. A sequence of file conversions to convert an input file from the original file type to a target file type may be determined. A sequence of file conversions may be performed in the order of the sequence to convert an input file from the original file type to the target file type. A converted file may be provided to the recipient.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Figure 1:
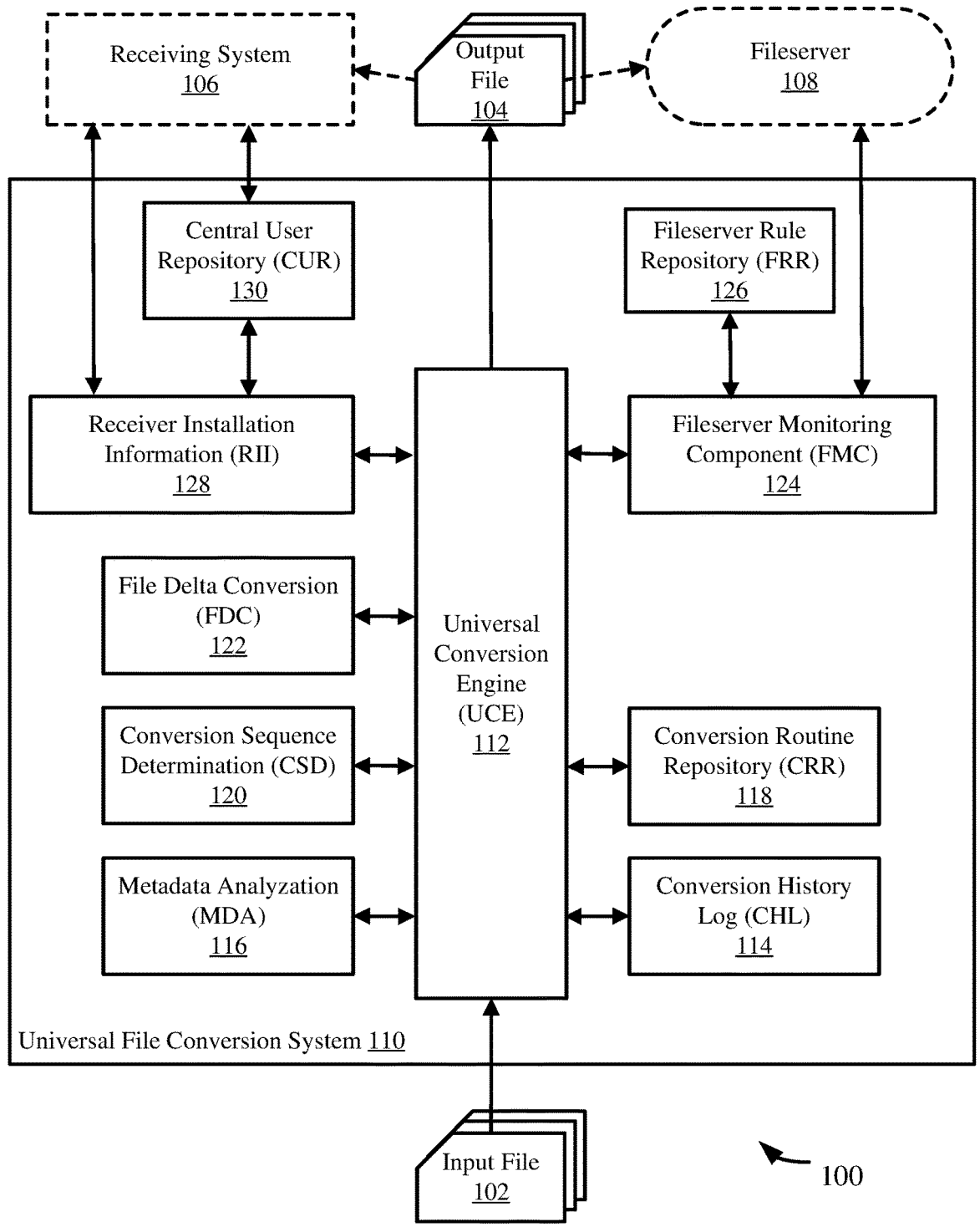
FIG. 1 is a schematic diagram of an architecture for a universal file conversion system.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Universal File Conversion System Overview

A universal file conversion system may be provided to automatically convert files from an unusable type (such as where no program is available at the system that supports the file type) to a usable type (such as where a program is available that supports the file type). The universal file conversion system may be integrated into existing software or into an existing system, and may run locally at a customer-side or client-side computing device, or may be provided as a central service from a network or cloud environment. Providing the universal file conversion system as a service from a centralized location may include registering users for the service.

For example, the universal file conversion system may be integrated into an email client or server. When an email with an attachment is received, the universal file conversion system may automatically detect the presence of the attachment and check if a program is available to the recipient to access the file. If no program is available, the universal file conversion system may then determine a suitable file type that the user can access and convert the received attachment to the new file type for the recipient. This conversion may be done automatically, so the user does not need to take any steps for the converted file to be available when the user opens the email. The converted file may be attached to the email along with the original file, or may be placed elsewhere on the recipient's system (such as at a predefined location or by providing a link to the converted file in the email). The universal file conversion system could be used similarly for other file exchange systems, such as a fileserver accessible for files exchanges by File Transfer Protocol (FTP) or other protocols. The universal file conversion system may use a folder structure to store converted files in a fileserver; for example, the original file may be placed in a requested location, and converted versions of that file may be placed in a folder in the same location. The universal file conversion system may be integrated into a software layer, in some embodiments.

Additionally, the input file (such as the received attachment) could have been created in a newer version of a program compared to the available programs at the receiving system, such as how Microsoft .doc files have varying versions. Opening such files in an older version of the program could cause issues, so identifying a compatible version in addition to a compatible program may be included as part of the universal file conversion system. The universal file conversion system may further recognize that a given file type may be supported by multiple programs, such as .doc files supported by both Microsoft OFFICE™ (Microsoft Corp., Redmond, Wash.) and OPENOFFICE™ (Apache Software Foundation, Wakefield, Mass.). The universal file conversion system may also recognize when file conversion is not needed and not convert the received file.

Generally converting a file (or file conversion) includes changing the type of the file without changing the data stored in the file. This may include changing the manner of storage or structure of storage of the data in the file, or the formatting of the data in the file. File conversion is generally accomplished by a file conversion routine that may be programmed directly into the universal file conversion system, or integrated into the file conversion system through one or more libraries. Other methods of integrating file conversion software into the universal file conversion system may be used as well, such as providing access to a service or microservice that has (or executes) the file conversion routine.

Example 2—Universal File Conversion System Architecture

FIG. 1 is a schematic diagram of an architecture 100 for a universal file conversion system 110. An input file 102 may be provided as input to the universal file conversion system. The universal file conversion system 110 may convert the input file 102 to an output file 104 having a different file type than the input file. The output file 104 may then be provided to a receiving system 106 or a fileserver 108.

In one embodiment, multiple input files 102 may be provided to the universal file conversion system 110, which may then convert the multiple input files to multiple output files 104. In some cases, each input file 102 will have a single corresponding output file 104, each output file having a different file type than the corresponding input file. The multiple output files 104 may have the same file type or different files types. The multiple output files 104 may then be provided to a receiving system 106 or a fileserver 108.

In another embodiment, a single input file 102 may be provided to the universal file conversion system 110, which may then convert the single input file into multiple corresponding output files 104. In such a scenario, each of the corresponding output files 104 may have a different file type (each of which being different from the input file type). In some cases, an output file 104 can be a file that is in the same format as the input file 102 (e.g., for a user having a system capable of reading the input file without conversion), or the output file can be in the same format as the input file, but having other properties different between the two files (e.g., size, quality, compression, editability, version etc.). Further, multiple input files 102 may be provided and converted to varying numbers of multiple output files 104 for each input file, with the output files having varying file types.

Figure 9A:
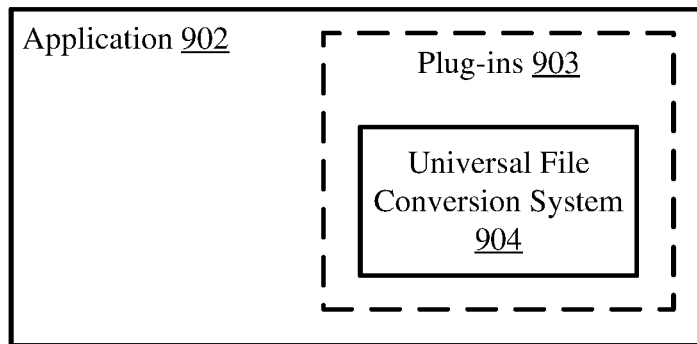
FIG. 9A is a schematic diagram depicting an application environment for a universal file conversion system.
Figure 9B:
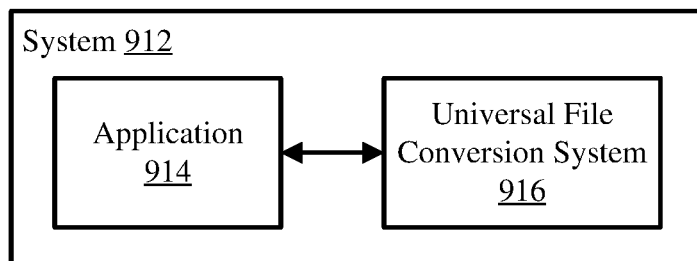
FIG. 9B is a schematic diagram depicting a system environment for a universal file conversion system.
Figure 9C:
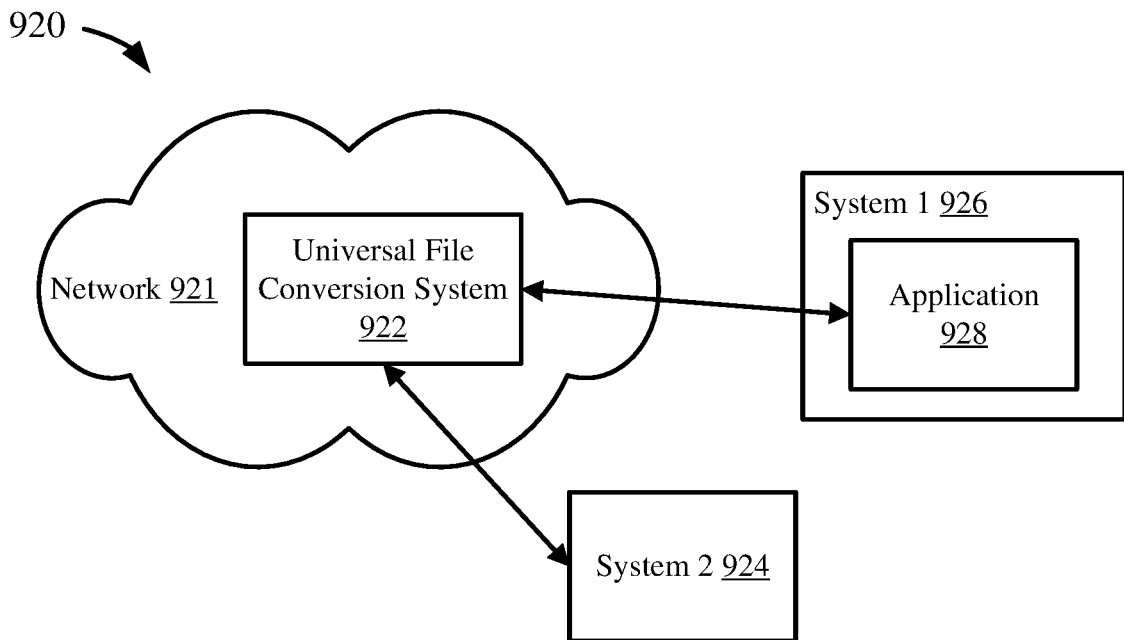
FIG. 9C is a schematic diagram depicting a network environment for a universal file conversion system.

The multiple output files 104 may then be provided to a receiving system 106 or a fileserver 108. The receiving system 106 or the fileserver 108 may be the same system on which the universal file conversion system 110 is installed, such as shown in FIGS. 9A-B. Alternatively, the receiving system 106 or the fileserver 108 may be separate systems from the system hosting the universal file conversion system 110, such as shown in FIG. 9C.

The universal file conversion system 110 may be composed of multiple modules or components which perform separate or distinct tasks. The universal file conversion system 110 may have a universal conversion engine (UCE) 112, a conversion history log (CHL) 114, a metadata analyzation component (MDA), a conversion routine repository (CRR) 118, a conversion sequence determination component (CSD) 120, a file delta conversion component (FDC) 122, a fileserver monitoring component (FMC) 124, a fileserver rule repository (FRR) 126, a receiver installation information component (RII) 128, or a central user repository (CUR) 130.

The receiver installation information component (RII) 128 may communicate with the universal conversion engine 112 and the receiving system 106. Information about the receiving system 106 is obtained from the receiving system by the receiver installation information component 128. Generally, the receiver installation information component 128 requests the information and analyzes the returned information. Such a request may take the form of a standard service or API call to the operating system of the receiving system 106. Alternatively, the information about the receiving system 106 may be obtained by scanning the receiving system's registry or accessing other common data sources for the particular operating system on the receiving system. The requested information may include a list of programs available at the receiving system 106. The requested information may include a list of file types supported by the receiving system 106, either directly or by applications at the receiving system. Additionally, the receiver installation information component 128 may communicate with the central user repository 130. The receiver installation information component 128 may obtain information about the receiving system 106 from the central user repository 130; this may be alternative to or supplemental to information obtained from the receiving system 106.

The central user repository (CUR) 130 may communicate with the receiving system 106 and the receiver installation information component 128. The central user repository 130 may store data regarding the receiving system 106 (or multiple receiving systems), such as programs available at the receiving system or file types supported by or at the receiving system. This data may include information about the available programs, such as their status, their version, file types supported, or any additions (e.g. plug-ins) to the program. The central user repository 130 may store user information for users registered with the universal file conversion system 110. Such user information may include receiving system information for a receiving system of that user. In this way, information about available programs may be determined based on a user/receiver of the input file 102.

The metadata analyzation component (MDA) 116 may communicate with the universal conversion engine 112. The metadata analyzation component 116 may access and analyze metadata in the input file 102. Metadata in the input file 102 may affect conversion of the input file 102. Such relevant metadata from the input file 102 may include a file type of the input file, a version of the file type, a read-only attribute, tracking data for if the file has been converted previously, or other metadata.

The conversion routine repository (CRR) 118 may communicate with the universal conversion engine 112. The conversion routine repository 118 may function as a library of conversion routines for converting one file type to another file type. The conversion routine repository 118 may contain DDLs (Data Definition Language) or plugins that support conversion from one file type to another, or provide the routine to convert one file type to another. The conversion routine repository 118 may include a searchable index of the available file conversion routines, which may include data about the conversion routines, such as an identifier, a version number, an input file type, or an output file type.

The conversion sequence determination component (CSD) 120 may communicate with the universal conversion engine 112. The conversion sequence determination component 120 may determine a sequence of file conversions to convert the input file 102 from its original file type to a target, or output, file type. The sequence of file conversions may be based on the available conversion routines, as determined from the conversion routine repository 118.

In some scenarios, a conversion routine may be available to convert the input file type directly to the target file type; in this case, the sequence of file conversions may be a single file conversion. In other scenarios, there may not be a conversion routine to directly convert the input file type to the target file type. In such cases, the conversion sequence determination component 120 may determine a series of conversions that will convert the input file type to the target file type. For example, a conversion routine to convert input type A to target type C may not be available. However, a conversion routine may be available to convert input type A to type B (A→B), and another conversion routine available to convert type B to target type C (B→C). The conversion sequence determination component 120 may then determine a sequence of file conversions such as type A to type B, then type B to type C (A→B, B→C). In this way, a sequence of file conversions may include multiple steps or file conversions.

The universal conversion engine (UCE) 112 may communicate with the conversion history log 114, metadata analyzation component 116, the conversion routine repository 118, the conversion sequence determination component 128, the file delta conversion component 122, the receiver installation information component, and the fileserver monitoring component 124. Generally, the universal conversion engine 112 may convert an input file 102 to an output file 104 of a different file type than the input file. The file conversion may be based on the input file type, the target file type, and the sequence of file conversions.

The universal conversion engine 112 may use the conversion routines available by executing the conversion routines with the input file 102 as input, or the conversion routines in the sequence provided by the sequence of conversion routines from the conversion sequence determination component 120. The conversion routines may be coded in the universal conversion engine 112, either directly or as functions or methods in libraries, or they may be available as DDLs or plug-ins (or from another source, such using a URI or calling an accessible service) accessible by the universal conversion engine. The universal conversion engine 112 may generate the output file 104 as the result of the file conversion, and may further provide the output file to the receiving system 106 or the fileserver 108.

The conversion history log (CHL) 114 may communicate with the universal conversion engine 112. A history of the conversions performed, including all intermediary conversions between an input file type and a target file type, may be stored in the conversion history log 114. For example, each conversion may be stored as a record in the conversion history log 114, or each sequence of file conversions may be stored as a record in the conversion history log. The conversion history log 114 may be used to improve or enhance the performance of the universal file conversion system 110.

The file delta conversion component (FDC) 122 may communicate with the universal conversion engine 112. In some scenarios, a previously converted file (output file 104) may be returned to the universal file conversion system 110 to be converted back to the original file type (of its corresponding input file 102). In such a scenario, the file delta conversion component 122 may be used to identify the changes in the data of the returned output file 104 compared the original input file 102, direct the universal conversion engine 112 to convert just the changed portions (which may include the other steps of file conversion, such as metadata analysis or conversion sequence determination), and then insert the converted changed portions into the original input file, returning the now updated input file. In this way, file conversion of a returned converted file may be improved, such as by quality of the returned file (by avoiding data loss in converting and reconverting unchanged parts) or by speed of conversion (which may include lowering computing resource usage, such as for large files like video data files). Such delta conversions may also avoid the loss of formatting or other information or special features due to imperfect or non-optimal file conversions.

The fileserver monitoring component (FMC) 124 may communicate with the universal conversion engine 112. Generally, the fileserver monitoring component 124 is analogous to the receiver installation information component 128 but for fileservers 108 rather than receiving systems 106 directly associated with users. Information about the fileserver 108 is obtained from the fileserver by the fileserver monitoring component 124. Generally, the fileserver monitoring component 124 requests the information and analyzes the returned information. Such a request may take the form of a standard service or API call to the operating system of the fileserver 108. Alternatively, the information about the fileserver 108 may be obtained by scanning the fileserver's registry or accessing other common data sources for the particular operating system on the fileserver.

The requested information may include a list of programs available at the fileserver 108. The requested information may include a list of file types supported by the fileserver 108, either directly or by applications at the receiving system. Additionally, the fileserver monitoring component 124 may communicate with the fileserver rule repository 126. The fileserver monitoring component 124 may obtain information about the fileserver 108 from the fileserver rule repository 126; this may be alternative to or supplemental to information obtained from the fileserver 108.

The fileserver rule repository (FRR) 126 may communicate with the fileserver monitoring component 124. The fileserver rule repository 126 may store data regarding the fileserver 108 (or multiple fileservers), such as programs available at the fileserver or file types supported by or at the fileserver. This data may include information about the available programs, such as their status, their version, file types supported, or any additions (e.g. plug-ins) to the program. The fileserver rule repository 126 may store fileserver information for fileservers registered with the universal file conversion system 110. In this way, information about available programs may be determined based on a fileserver destination of the input file 102. The information or rules stored in the fileserver rule repository 126 may generally be obtained from the fileserver monitoring component 124. In an alternative embodiment, the fileserver rule repository 126 may communicate with the fileserver 108 and obtain such information directly.

Generally, the universal conversion engine 112 may act as a central communication hub for the various components in the universal file conversion system 110, such as by routing or coordinating communication between different components. In an alternative embodiment, other components of the universal file conversion system 110 may communicate directly with each other. For example, the conversion sequence determination component 120 may communicate directly with the conversion routine repository 118 rather than through the universal conversion engine 112. Other components may similarly communicate with each other directly. In addition, functionality shown in one component may be combined with functionality of another component, functionality of one component split into multiple components, or functionality otherwise distributed amount components of a computing system.

Example 3—File Conversion Process

Figure 2:
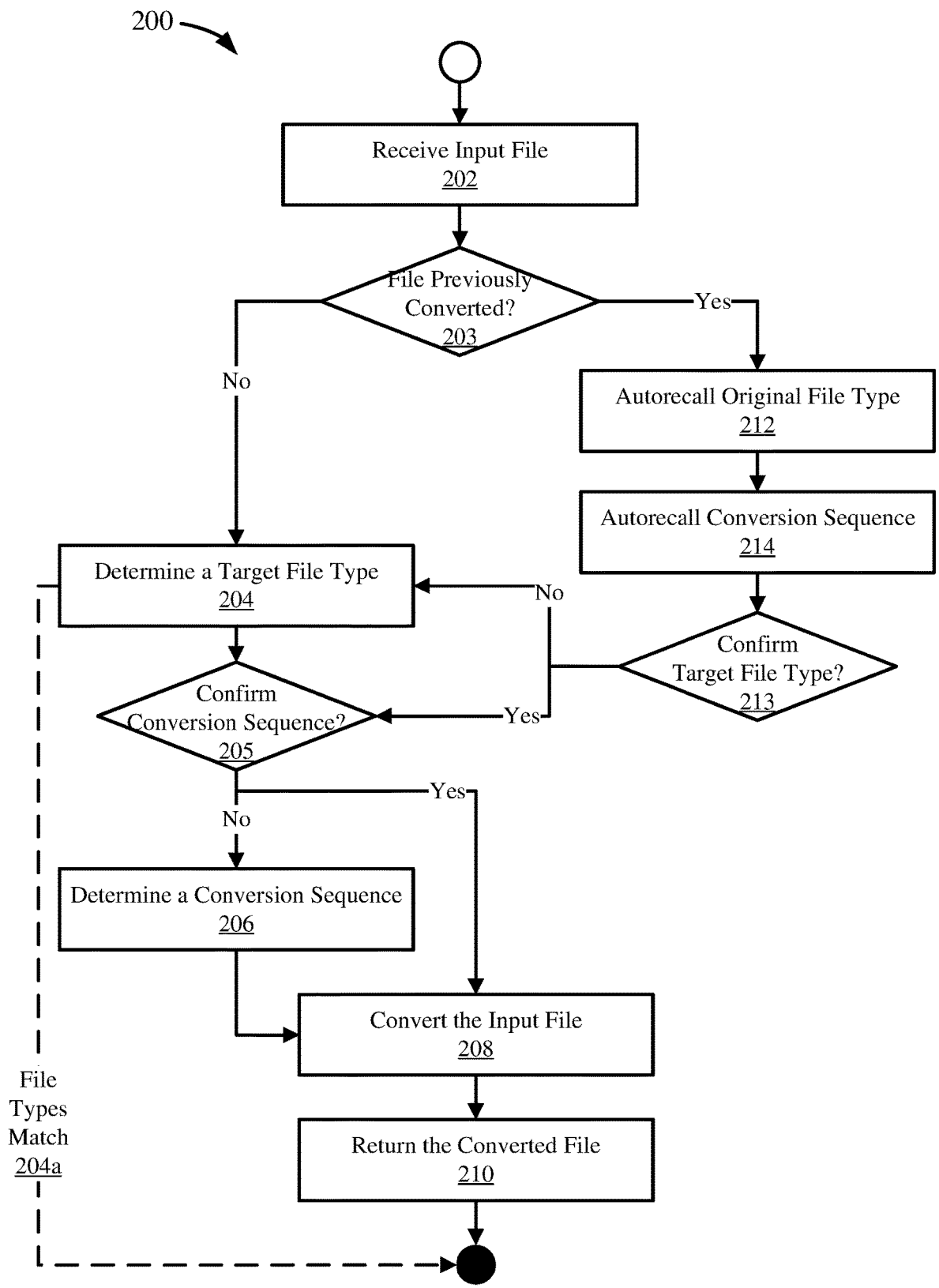
FIG. 2 is a flowchart illustrating a process for universal file conversion.

FIG. 2 is a flowchart illustrating a process 200 for universal file conversion. The process 200 can occur, for example, in the architecture 100 of FIG. 1. An input file having an input file type may be received at 202. As part of receiving the input file at 202, the file type of the input file may be determined. Determining the input file type may include reading a file extension from the file name of the input file, such as reading ".doc" from the filename "example.doc" of the input file. Alternatively, the input file type may be determined by a metadata field in the input file, such as reading in the metadata <file-type>.doc</file-type> of the input file "example.doc." As part of receiving the input file at 202, a recipient (or receiver or user) of the input file may be determined. A recipient may be determined from data in a transfer file or message, such as a user ID. For example, a recipient may be determined from a user email address or user ID in an email message with the input file as an attachment. In another example, a recipient may be determined based on user access rights to a target folder in a fileserver receiving the input file; such access rights or ownership may be determined from a user ID field in the file structure or registry. In general, file transfer message may include a recipient field that may be populated with a username, email address, user ID, or other unique identifier for the recipient; such a field may be accessed to determine the recipient. Further, the process 200 may end immediately if the universal file conversion system determines, based on the input file type, that a suitable program that supports the file type is available (at the receiving system or fileserver).

Next, a determination is made at 203 if the input file was previously converted or not. If the input file was not previously converted ("no" at 203), then a target file type is determined at 204. Determining the target file type at 204 may include analyzing the available programs of the receiving system or fileserver, previous use conversion records, user preferences, user input, or results of metadata analysis, as described herein. Further, once a target file type is determined at 204, if the target file type matches the input file type 204a, the process 200 may end as no conversion is needed. Alternatively, a determination may be made before the process 200 beings that no conversion is needed as a program supporting the file type is available.

A determination is made at 205 if a conversion sequence is available or valid for converting the received input file to the determined target file type, which may include confirming that a retrieved sequence of file conversions is a valid sequence or was successfully retrieved. In some cases, a sequence of file conversions may not be reversible, as described herein; thus, confirming the sequence of file conversions may include confirming that the sequence used to convert from the input file type to the target file type can be used successfully to convert from the target file type to the input file type. Generally, there will not be a sequence of file conversions available if such a sequence has not been auto-recalled.

If there is not a sequence of file conversions ("no" at 205), a sequence of file conversions is determined at 206. Determining a sequence of file conversions may include analyzing the original file type and target file type, analyzing available conversion routines, previous conversion records, quality records of previous conversions, user preferences or user-specific records, or user input. Once a sequence of file conversions is determined (either at step 206 or "yes" at 205), the input file is converted to the target file type at 208. The file conversion may be performed based on the sequence of file conversions using the available conversion routines, as described herein. The converted file is then provided as output, such as to a receiving system or fileserver, at 210.

If the input file was previously converted ("yes" at 203), then the original file type may be automatically recalled at 212. This may include retrieving the original file type from a stored field, such as a metadata field in the input file or a stored field in the universal file conversion system. The previously used sequence of file conversions may be automatically recalled at 214. This may include retrieving the sequence of file conversions from a stored field, such as a metadata field in the input file or a stored field in the universal file conversion system. The auto-recalled target file type may be confirmed at 213, which may include confirming that the retrieved target file type is a valid type or was successfully retrieved. If the target file type was successfully auto-recalled ("yes" at 213), then the sequence of file conversions is confirmed at 205, as previously described. If the target file type was not successfully auto-recalled ("no" at 213), then the target file type is determined at 204, as previously described.

In an alternative embodiment, auto-recall features may not be implemented. In such an embodiment, an input file may be received at 202, a target file type may be determined at 204, a sequence of file conversions may be determined at 206, the input file may be converted to the target file type at 208, and the output file of the target file type may be provided at 210.

In another alternative embodiment, the auto-recall feature may only retrieve the original file type. In such an embodiment, a previously used sequence of file conversions would not be retrieved, so steps 214 and 205 would not be included in the process. If an auto-recalled target file type is confirmed ("yes" at 213), next a sequence of file conversions would be determined at 206.

In another alternative embodiment, the auto-recall feature may only retrieve the sequence of file conversions previously used. In such an embodiment, the original file type would not be retrieved, so steps 212 and 213 would not be included in the process. In such an embodiment, after auto-recalling the sequence of file conversions, the sequence of file conversions may be confirmed at 205. In some scenarios, a target file type may be determined, as at 204, based on the auto-recalled sequence of file conversions. In other scenarios, a target file type may be determined, as at 204, and that determination may be used, in part, to confirm the sequence of file conversions at 205.

In some scenarios, an input file may not be convertible to a file type supported by the receiving system (or fileserver). This may occur when no target file type can be determined because there is not a program available that supports the input file type or a related file type to which the input file type could be converted. In such cases, the universal file conversion system may trigger a notice to the user, or may have access to a network to download a suitable program and run the installation (which may either support the file type directly, or support a related file type). This may also occur when a conversion routine is not available to convert the input file type to the target file type (or any of the potential target file types). In such cases, the universal file conversion system may trigger a notice to the user, or may have access to a network to download a suitable conversion routine, such as a conversion routine library, that it can add to its available conversion routines and thereby be able to convert the file.

Example 4—Target File Type Determination

Figure 3:
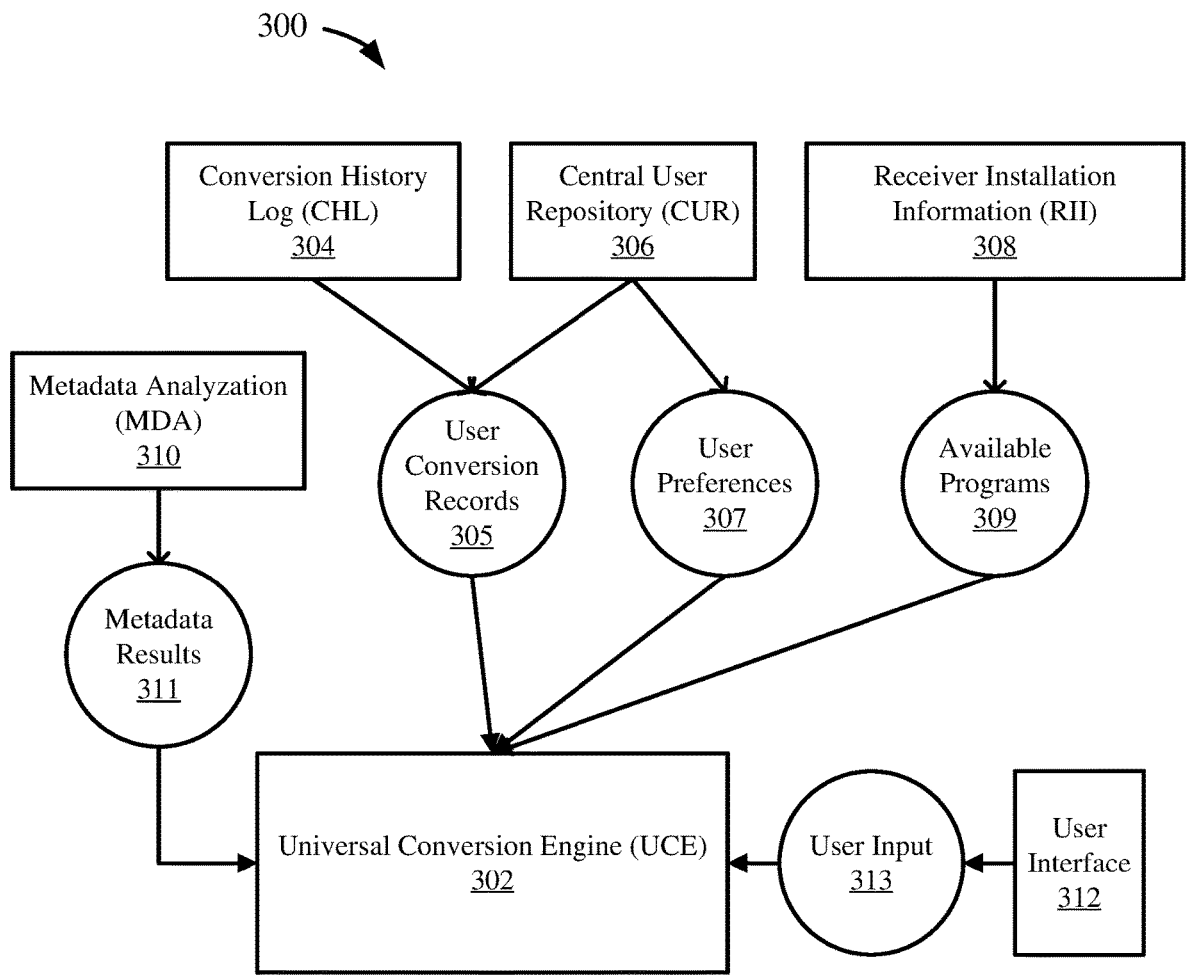
FIG. 3 is a diagram illustrating the components of target file type determination.

FIG. 3 is a diagram 300 illustrating the components used to determine a target file type. A universal conversion engine (UCE) 302 may determine a target file type for file conversion based on data received from multiple sources. The universal conversion engine 302 may be the universal conversion engine as shown in FIG. 1 and otherwise described herein.

The universal conversion engine 302 may use data about the available programs 309 from a receiver installation information component (RII) 308 to determine a target file type. The receiver installation information component 308 may be the receiver installation information component as shown in FIG. 1 and otherwise described herein. The available programs data 309 may include a list of the available programs at a receiving system, and may further include which file types are supported by those programs. The available programs data 309 may include program versions, as in some cases different versions of the same program may support different file types or may have varying quality in their support of different file types.

The available programs data 309 may include information about the quality of support for the different file types supported by each program. For example, two available programs may both support a given file type, but one program may be known to have a high quality of support for the file type than the other program. Video players are one example where two players may both play MPEG formatted video files, but one player may do so at a higher resolution or video quality (better decompression) than the other. The universal conversion engine 302 may use any or all of this available programs data 309 in determining a target file type to convert an input file into. Alternatively, the receiver installation information component 308 may be a fileserver monitoring component (FMC), as shown in FIG. 1 and otherwise described herein, in cases where the receiving system is a fileserver. In such cases, the available programs data 309 may be data from the fileserver as obtained by the fileserver monitoring component.

The universal conversion engine 302 may use metadata from the input file or results of analysis of the metadata of the input file 311 from a metadata analyzation component (MDA) 310 to determine a target file type. The metadata analyzation component 310 may be the metadata analyzation component as shown in FIG. 1 and otherwise described herein. The metadata analyzation component 310 may analyze the metadata of an input file and provide the results of the analysis 311 to the universal conversion engine 302 for use in determining a target file type. Alternatively, the metadata analyzation component 310 may extract any metadata deemed relevant from the input file and provide the extracted metadata 311 itself to the universal conversion engine 302. Such metadata results 311 may include a read-only flag or attribute, which may help determine if the target file type should be for a view-only program of the available programs 309 or if the target file type should be for an editor program of the available programs.

The metadata results 311 may include any data on a previous conversion of the file, such as an original or previous file type, a return file type, a previously used sequence of file conversions, changes to the data in the file, or other data useful for converting the file. For example, an indicator may be set in the metadata of the input file indicating the file has previously been converted and what the original file type is, which the universal conversion engine 302 may use directly as the target file type rather than determining a target file type. The metadata of the input file may also track a file for such reconversion purposes, such as in the case of a file name change by a user.

The metadata results 311 may also include the current, or original, file type of the input file, which may be used by the universal conversion engine 302 in determining a target file type, or to determine a sequence of file conversions, as described herein. Determining the file type of the input file from the input file's metadata may be beneficial to avoid reading and using an incorrect file extension, for example.

The universal conversion engine 302 may use user preferences 307 from a central user repository (CUR) 306 to determine a target file type. The central user repository 306 may be the central user repository as shown in FIG. 1 and otherwise described herein. User preferences 307 may include which programs of the available programs 309 a user prefers to use, or which file types a user prefers (or which file types supported by the available programs a user prefers). User preferences 307 may include user selections of specific target file types for specific input file types; for example, user preferences may include a direction to convert file type A to file type D. User preference information 307, in some aspects, can specify preferences for particular programs. For instance, a user may have multiple document viewer or edit programs, and may use to use a first file type or format with a first program and a second file type of format with a second program.

User preferences 307 may also include information about the use of metadata (e.g. such as a preference to ignore a read-only flag in the metadata), or levels of quality acceptable in conversion, or other factors considered in determining a target file type. Alternatively, a fileserver rule repository (FRR), as shown in FIG. 1 and otherwise described herein, may take the place of the central user repository 306 in cases where the receiving system is a fileserver. In such cases, user preferences 307 may be fileserver preferences, and may be established by a system administrator or other user of the fileserver.

The universal conversion engine 302 may use user conversion records 305 from the central user repository 306 or the conversion history log (CHL) 304 to determine a target file type. The conversion history log 304 may be the conversion history log as shown in FIG. 1 and otherwise described herein. The user conversion records 305 may be from either the conversion history log 304, the central user repository 306, both, or obtained by cross-referencing both components, such as by obtaining a user identifier from the central user repository and using that to obtain user-specific conversion records from the conversion history log.

The user conversion records 305 may be user-specific or may be general across multiple users. The user conversion records 305 may include information on previous file conversions, and may further include information on the quality of (or user response to) previous file conversions. Such information may be used to determine a target file type by identifying common conversion patterns, such as file type A is most commonly converted to file type C. Alternatively, the user conversion records 305 may be fileserver conversion records from a fileserver rule repository, as shown in FIG. 1 and otherwise described herein, in place of the central user repository 306, when the receiving system is a fileserver.

The universal conversion engine 302 may use user input 313 from a user interface 312 to determine a target file type. User input 313 may be an affirmative selection by a user of several target file type options presented to the user through the user interface 312, such as via a dialog box in a GUI. User input 313 may be a confirmation to convert the file to an already-determined target file type from the user interface 312 as a confirmation request dialog box 312. In one embodiment, the user interface 312 may include a screen allowing a user to set user preferences 307.

The universal conversion engine 302 may use any or all of the metadata results 311, the user conversion records 305, the user preferences 307, the available programs 309, and the user input 313 to determine a target file type. The universal conversion engine 302 may also have logic to resolve any determination clashes, such as when two file types are available to be the target file type based on the given data. Such logic may include selecting the first determined, the last determined, the target file type with a preferred sequence of file conversions (such as shortest or best quality), converting to both available types, or other solutions.

Example 5—File Conversion Sequence

Figure 4A:
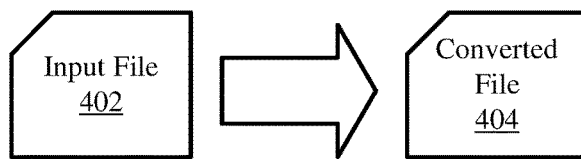
FIG. 4A is a diagram illustrating a file conversion sequence.

FIG. 4A illustrates a file conversion sequence. An input file 402 may be converted, or transformed, into a converted file 404. The input file 402 has an input file type and the converted file 404 has a target file type, which is generally different from the input file type. Or, the file types can be the same, but can represent different version of a file type (e.g., for different versions of an application), or can have different qualities (such as quality, in terms of loss or compression, or being editable or read-only). Generally, file conversion does not change the substantive data of the input file 402, but only changes the internal formatting or representation of the data (including, for example, compression settings, audio output settings, read-only settings, and the like). Thus, the converted file 404 may have the same substantive data as the input file 402, but represented differently within the converted file 404 (compared to the input file 402). In some cases, metadata or data can change between the input file 402 and the converted file 404, such as changing a metadata flag, appending metadata (e.g., a document identifier), or changing data the influences how data is displayed (e.g., modifying, removing, or adding formatting).

The file conversion sequence in FIG. 4A is a direct, or one-step, conversion. Generally, a direct conversion such as this is preferred, because it may be a higher quality conversion (or result in less loss of data or other formatting) or it may be more efficient (use fewer system resources or be faster).

Figure 4B:
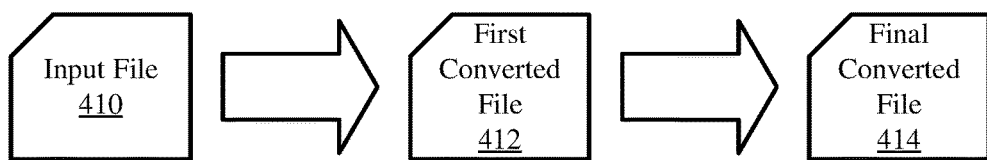
FIG. 4B is a diagram illustrating a multi-step file conversion sequence.

FIG. 4B illustrates a sequence of file conversions with two conversions. An input file 410, having an input file type, may be converted to a target file type. Converting the input file 410 to the target file type may include converting the input file to a first converted file 412, of an intermediary file type, and then converting the first converted file to a final converted file 414, of the target file type. In some cases, file conversion routines may not be available to convert directly from the input file type of the input file 410 to the target file type of the final converted file 414, but conversion routines may be available to convert the input file type to the intermediary file type of the first converted file 412 and then convert the intermediary file type to the target file type. In some cases, conversion routines may not be available due to low quality of the results of the conversion routines, the conversion routines may not yet be incorporated into the universal file conversion system, or conversion routines may not yet be developed. Using intermediary file conversions as illustrated may resolve such situations and allow the input file to be converted to the target file type.

Figure 4C:
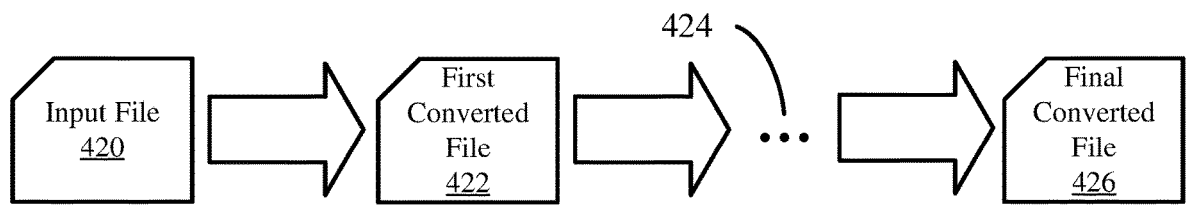
FIG. 4C is a diagram illustrating a multi-step file conversion sequence of any number of steps.

FIG. 4C illustrates a sequence of file conversions of any number of conversions. An input file 420, having an input file type, may be converted to a target file type. Converting the input file 420 to the target file type may include converting the input file to a first converted file 422, of an intermediary file type. The first converted file 422 may be converted to a second converted file, of a second intermediary file type, which may be converted to a third converted file of a third intermediary file type, and so on 424 until a file type is reached that can be converted to the target file type. Then the file is converted to a final converted file 426, of the target file type. This is similar to the file conversion sequence shown in FIG. 4B, but with a variable number of intermediary file conversions with varying file types. Generally, the intermediary file conversions do not repeat file types.

Figure 4D:
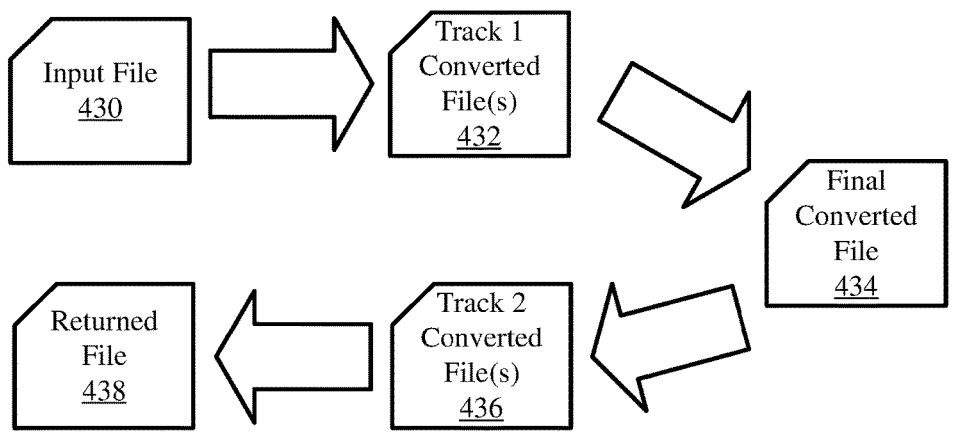
FIG. 4D is a diagram illustrating a file conversion sequence and a return conversion sequence.

FIG. 4D illustrates a sequence of file conversions and a return sequence of file conversions. An input file 430 having an input file type may be converted to a final converted file 434 having a target file type. The conversion to the final converted file 434 may go through Track 1 converted file(s) 432, which may include no intermediary files as shown in FIG. 4A, or one or more intermediary files having intermediary file types as shown in FIGS. 4B-C. The final converted file 434 may be converted back to the input file type as returned file 438. The returned file 438 may have the same file type as the input file 430, but may have different data within it, for example, because additions or changes were made to the final converted file 434. The conversion to the returned file 438 may go through Track 2 converted file(s) 436, which may include no intermediary files as shown in FIG. 4A, or one or more intermediary files having intermediary file types as shown in FIGS. 4B-C.

In one scenario, Track 2 converted files 436 may be the same intermediary files as Track 1 converted files 432, but the conversions are done in reverse of Track 1. In this scenario, a new sequence of file conversions may not need to be determined if the original (Track 1) sequence was maintained. In another scenario, one or more file conversions may not be reversible and so a new sequence of file conversions may need to be determined. In such a scenario, Track 2 converted files 436 may be a different set from the Track 1 converted files 432, or may be in a different order. Confirming that a retrieved original (Track 1) sequence is usable as at step 205 of the process 200 of FIG. 2 may include determining if the original (Track 1) sequence can be reversed.

In other aspects, a sequence of file conversion steps may be different between different conversions, or conversion and reconversion, for other reasons. For instance, a more optimal conversion route may have been determined after an initial conversion. Or, the preferences of a user, or capabilities, may have changed between when the user initially sent or received a file. In another aspect, a new conversion routine may have become available, such as routine that provides more direct conversion or results in better conversion.

The following is an example of file conversion sequences based on available conversion routines. File conversion routines 01, 02, 03, and 04 are available. Routine 01 converts file type A to file type B, and type B to type A. Routine 02 converts type B to type C, and type C to type B. Routine 03 converts type C to type D. Routine 04 converts type D to type C. For input file type A and target file type B, the file conversion sequence is a single step of executing Routine 01, or by types A→B. The return conversion can also use Routine 01 (R01).

For input file type A and target file type C, the conversion sequence is Routine 01 then Routine 02 (R01R02), or by types A→B→C. The return conversion sequence can work in reverse for this scenario as well. For input file type A and target file type D, the conversion sequence is Routine 01, Routine 02, then Routine 03 (R01R02R03), or by types A→B→C→D. In this scenario, the conversion sequence does not work for a return conversion, because Routine 03 does not convert type D to type C. Instead, the return conversion sequence is Routine 04, Routine 02, Routine 01 (R04R02R01), or by type D→C→B→A.

Example 6—File Conversion Sequence Determination

Figure 5A:
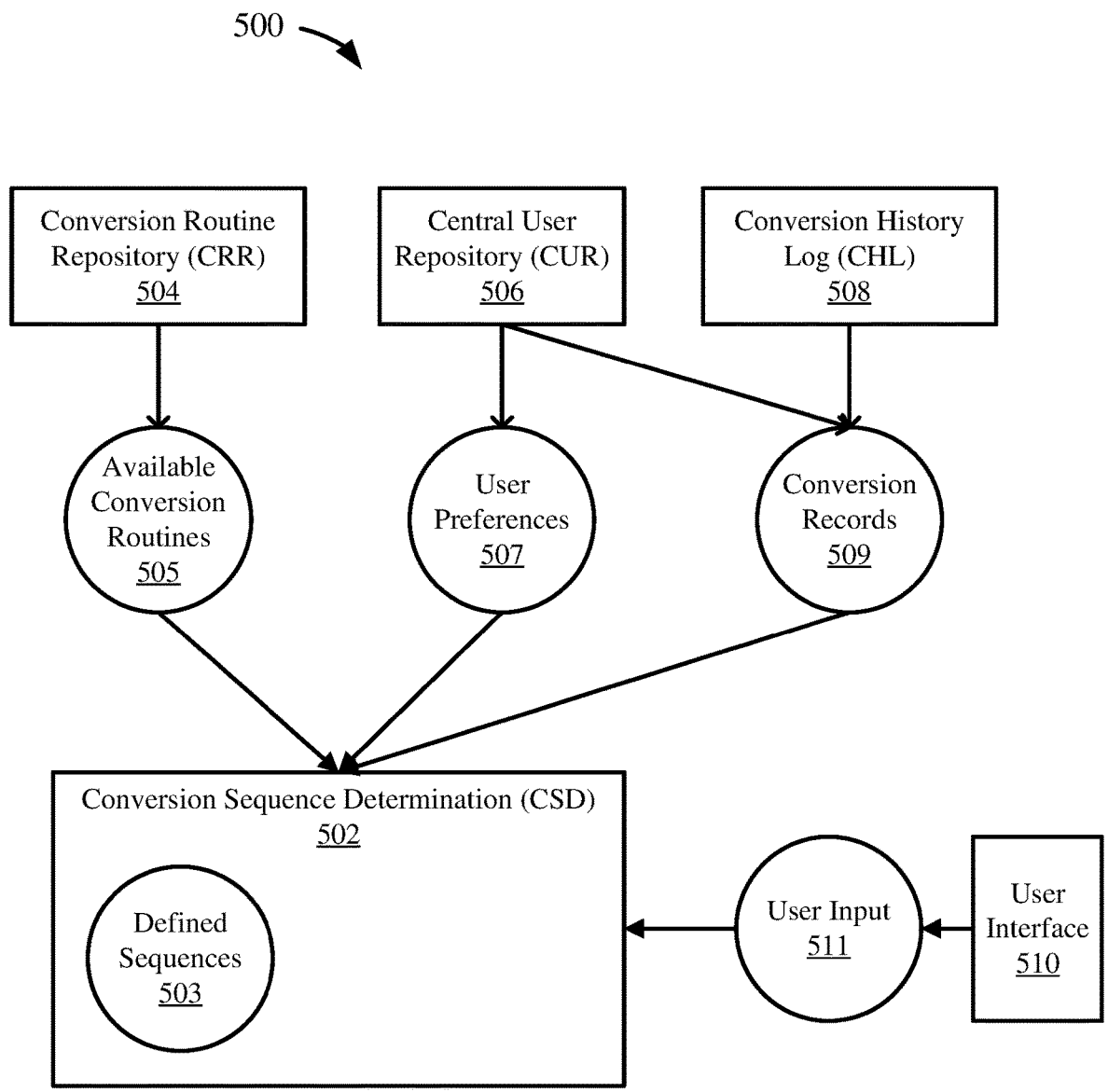
FIG. 5A is a diagram illustrating the components of file conversion sequence determination.

FIG. 5A is a diagram 500 illustrating components that can be used to determine a sequence of file conversions. A conversion sequence determination component (CSD) 502 may determine a sequence of file conversions based on data received from multiple sources. The conversion sequence determination component 502 may be the conversion sequence determination component as shown in FIG. 1 and otherwise described herein.

The conversion sequence determination component 502 may use defined sequence data 503 to determine a sequence of file conversions. The defined sequences 503 may be predefined and may indicate a sequence of file conversions for a given input file type and a given target file type. The defined sequences 503 may be stored in a table, an index, a registry, a data file, a database, or other data storage either in the conversion sequence determination component 502 or accessible by the conversion sequence determination component.

Each given file conversion sequence of the defined sequences 503 may have key identifiers of an input file type (or a starting file type) and a target file type (or a final file type), one or more intermediary file conversions, and an order for the file conversions. For example, a sequence of file conversions may be stored in a table as a row with each column providing the next file conversion and the start and end columns as key identifiers. As another example, each sequence of file conversions may be stored as a record in an index, and each record containing the described data for the sequence; the record may be a single field or multiple fields.

The conversion sequence determination component 502 may have logic for determining a sequence of file conversions from a given input file type to a determined target file type based on data from several sources other than the defined sequences 503. The logic in the conversion sequence determination component 502 may be any path determination logic or algorithm to determine a series of file conversions (a path) from the input file type to the target file type using available conversion routines that convert to intermediary file types that lead to the target file type, and other data available as well that may refine the path or help select a unique path.

The conversion sequence determination component 502 may use data about the available conversion routines 505 from a conversion routine repository (CRR) 504 to determine a sequence of file conversions. The conversion routine repository 504 may be the conversion routine repository as shown in FIG. 1 and otherwise described herein. The available conversion routines data 505 may include a list of the available conversion routines in the universal file conversion system and which file types they convert. The available conversion routines data 505 may include routine versions, as in some cases different versions of the same routine may convert different file types or may have varying quality in their conversion of different file types.

The available conversion routines data 505 may include information about the quality of conversion for the different file types converted by each routine. For example, two available routines may both convert a given file type to another file type, but one routine may be known to have a higher quality of conversion for the file type than the other program, or may support converting additional file features that the other routine does not; video compression/conversion routines are one example where two different routines may both convert MPEG formatted video files, but one routine may be lossier than the other. The conversion sequence determination component 502 may use any or all of this available conversion routines data 505 in determining a sequence of file conversions.

The conversion sequence determination component 502 may use user preferences 507 from a central user repository (CUR) 506 to determine a sequence of file conversions. The central user repository 506 may be the central user repository as shown in FIG. 1 and otherwise described herein. User preferences 507 may include which conversion routines of the available conversion routines 505 a user prefers to use, or which version of an available routine. User preferences 507 may include user selections of specific conversion routines for specific target file types or specific input file types; for example, user preferences may include a direction to convert file type A to file type D using routine Z.

User preferences 507 may also include information about the use of metadata (e.g. such as a preference to ignore a read-only flag in the metadata), or levels of quality acceptable in conversion, or other factors considered in determining a sequence of file conversions. Alternatively, in cases where the receiving system is a fileserver, a fileserver rule repository (FRR), as shown in FIG. 1 and otherwise described herein, may be used in place of the central user repository 506. In such cases, the user preferences 507 may be fileserver preferences, as may be set by a system administrator of the fileserver or other fileserver user, and may be used similarly to the user preferences 507.

The conversion sequence determination component 502 may use conversion records 509 from a conversion history log (CHL) 508 to determine a sequence of file conversions. The conversion history log 508 may be the conversion history log as shown in FIG. 1 and otherwise described herein. Alternatively, the conversion records 509 may be user conversion records and may be from either the conversion history log 508, the central user repository 506, both, or obtained by cross-referencing both components, such as by obtaining a user identifier from the central user repository and using that to obtain user-specific conversion records from the conversion history log. Thus, the conversion records 509 may be user-specific or may be general across multiple (or all) users. The conversion records 509 may include file conversion sequences used in previous file conversions, and may further include information on the quality of (or user response to) previous file conversion sequences. Such information may be used to determine a sequence of file conversions by identifying a sequence from the conversion records matching an input file type and target file type that match the current file types.

The conversion sequence determination component 502 may use user input 511 from a user interface 510 to determine a sequence of file conversions. User input 511 may be an affirmative selection by a user of several sequence options presented to the user through the user interface 510, such as via a dialog box in a GUI. User input 511 may be a confirmation to use an already-determined sequence from the user interface 510 as a confirmation request dialog box 510. In one embodiment, the user interface 510 may include a screen allowing a user to set user preferences 507. In some aspects, user input is not used in automatic file conversion.

The conversion sequence determination component 502 may use any or all of the defined sequences 503, the available routines 505, the user preferences 507, the conversion records 509, and the user input 511 to determine a sequence of file conversions. The conversion sequence determination component 502 may also have logic to resolve any determination clashes, such as when two different sequences are available to be convert the input file type to the target file type based on the given data. Such logic may include selecting the first determined, the last determined, the shortest or longest sequence, or other solutions.

Example 7—File Conversion Sequence Determination Logic

Figure 5B:
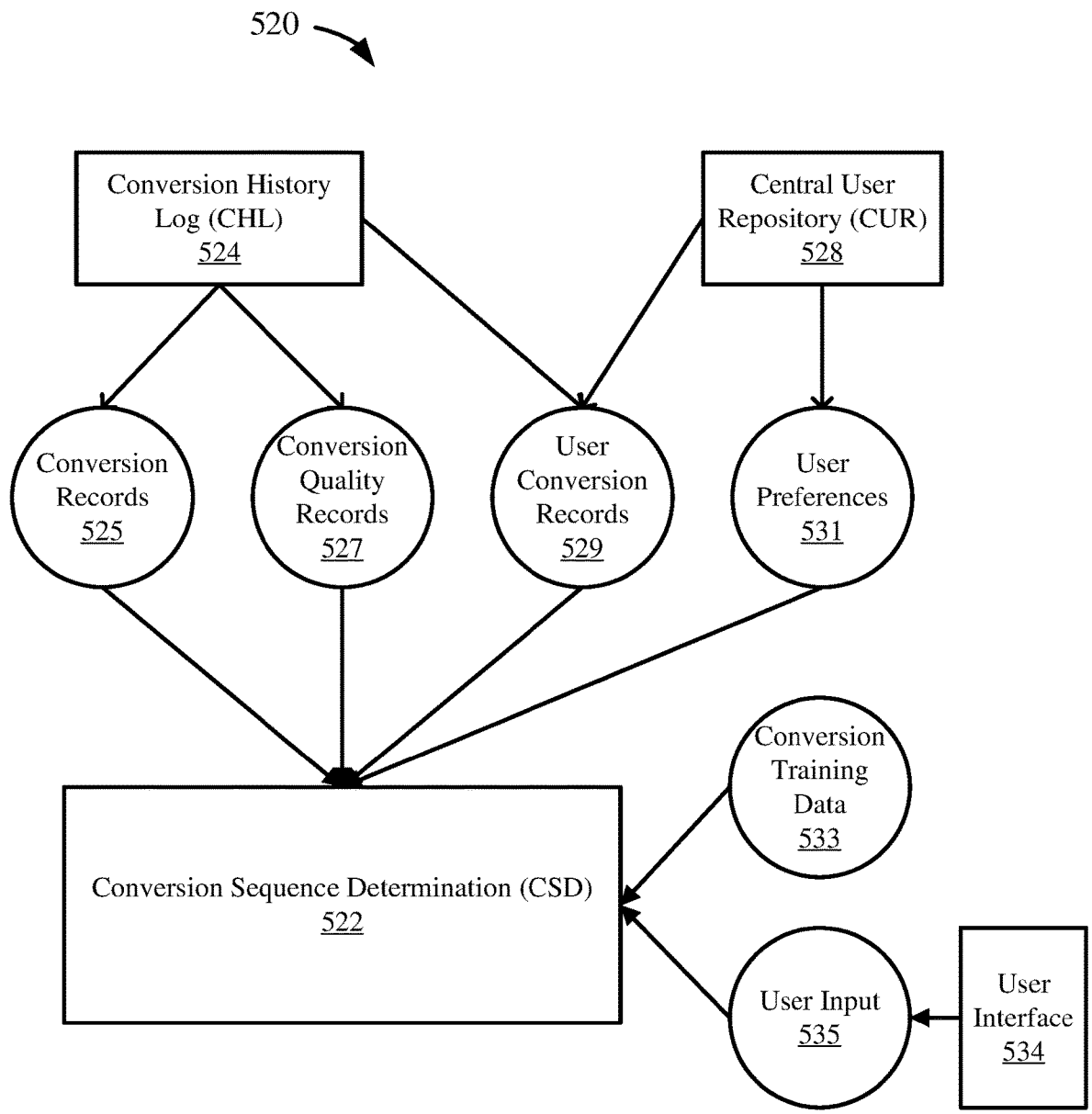
FIG. 5B is a diagram illustrating the components of file conversion sequence determination logic and improvement.

FIG. 5B is a diagram 520 illustrating the components of file conversion sequence determination logic and improvement. A conversion sequence determination component (CSD) 522 may include logic for determining a sequence of file conversions based on a starting (input or original) file type and an ending (target or final) file type. The conversion sequence determination component 522 may be the conversion sequence determination component shown in FIGS. 1 and 5A, and as described herein.

The logic in the conversion sequence determination component 522 may be any path determination logic or algorithm to determine a series of file conversions (a path) from the input file type to the target file type using available conversion routines that convert to intermediary file types that lead to the target file type, and other data available as well that may refine the path or help select a unique path. A path determination algorithm may be an algorithm for solving the traveling salesman problem (TSP) or related problems (e.g. the vehicle routing problem), such as a nearest neighbor algorithm, branch-and-bound algorithm, the Held-Karp algorithm, pairwise exchange, or other related algorithms.

In some embodiments, the logic for determining a sequence of file conversions may an algorithm or logical structure developed or improved through machine learning. For example, the logic may be implemented as an artificial neural network trained to determine the sequence of file conversions. Alternatively, the logic may be a path determination algorithm trained through supervised learning, unsupervised learning (which may include using user feedback), or reinforcement training. Such machine learning techniques generally use large sets of already established solutions (such as the sequence of file conversions) to refine the logic to better return such outcomes for unknown (new) inputs. Further, such techniques may be implemented to operate during runtime of the application (the universal file conversion system) so that the logic is continuously improved as the system performs file conversions.

Generally, such machine learning uses additional data or feedback data (training data) to retrain or improve or otherwise update the logic for sequence determination. Generally, such data includes a known outcome, such as the actual sequence of file conversions for the given input and target file types, and other factors such as quality of the outcome or efficiency in processing (such as resource usage or time taken). The conversion sequence determination component 522 may obtain such data from several sources.

The conversion sequence determination component 522 may obtain conversion records 525 or conversion quality records 527 from a conversion history log (CHL) 524 to train or improve conversion sequence logic. The conversion history log 524 may be the conversion history log as shown in FIGS. 1 and 5A and otherwise described herein. The conversion records 525 may include complete conversion sequences from previous conversions performed by the universal file conversion system. The conversion quality records 527 may include information about the quality of the file conversions, either entire sequences of file conversions or singular file conversions. The conversion quality records 527 may be stored or used as part of the conversion records 525.

The conversion sequence determination component 522 may obtain user preferences 531 from a central user repository (CUR) 528 to train or improve the conversion sequence logic. The central user repository 528 may be the central user repository as shown in FIGS. 1 and 5A, and otherwise described herein.

User preferences 531 may include which conversion routines a user prefers to use, or which version of a routine. User preferences 531 may include user selections of specific conversion routines for specific target file types or specific input file types; for example, user preferences may include a direction to convert file type A to file type D using routine Z. User preferences 531 may also include information about the use of metadata (e.g. such as a preference to ignore a read-only flag in the metadata), or levels of quality acceptable in conversion, or other factors considered in determining a sequence of file conversions.

Alternatively, in cases where the receiving system is a fileserver, a fileserver rule repository (FRR), as shown in FIG. 1 and otherwise described herein, may be used in place of the central user repository 528. In such cases, the user preferences 507 may be fileserver preferences, as may be set by a system administrator of the fileserver or other fileserver user, and otherwise used similarly to the user preferences 531.

The conversion sequence determination component 522 may obtain user conversion records 529 from the conversion history log 524, the central user repository 528, or both (including by cross-reference), to train or improve the conversion sequence logic. The conversion history log 508 may be the conversion history log as shown in FIG. 1 and otherwise described herein. The user conversion records 529 may include file conversion sequences used in previous file conversions, and may further include information on the quality of (or user response to) previous file conversion sequences. Alternatively, in cases where the receiving system is a fileserver, a fileserver rule repository (FRR), as shown in FIG. 1 and otherwise described herein, may be used in place of the central user repository 528. In such cases, the user conversion records 529 may be fileserver user records and otherwise used similarly to the user conversion records.

The conversion sequence determination component 522 may use user input 535 from a user interface 534 to train or improve the conversion sequence logic. User input 535 may be user-selected or user-defined training data for the conversion sequence logic. For example, a user may select which records of the conversions records 525 to use in training or improving the conversion sequence logic. In one embodiment, the user interface 534 may include a screen in a GUI. In some aspects, user input may not be used in automatic file conversion or automatic machine learning.

The conversion sequence determination component 522 may obtain conversion training data 533 for training or improving the conversion sequence logic. The conversion training data may include multiple records of file conversion sequences and may be used to initially train the logic to determine correct, available, or preferred conversion sequences. Such conversion training data may be processed in batch, separate from run-time processing of other data.

Example 8—Metadata in File Conversions

Figure 6:
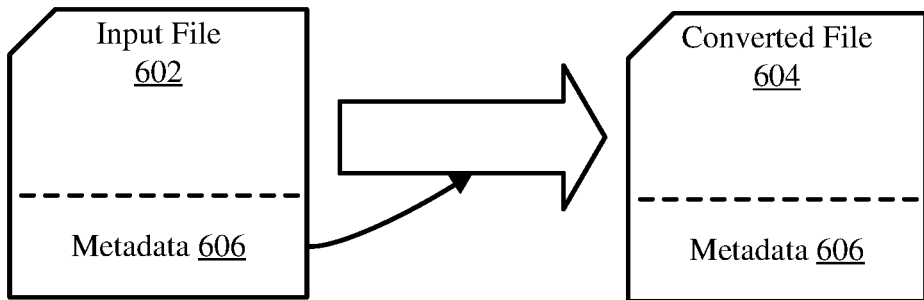
FIG. 6 is a diagram illustrating the use of metadata in file conversion.

FIG. 6 illustrates the use of metadata in file conversion. An input file 602 may have metadata 606, in addition to having a data and a file type. The input file 602 may be converted to the converted file 604, which generally has a different file type than the input file but retains the same data. Further, converted file 604 may have the same metadata 606 as the input file 602. Generally, metadata 606 is stored within the file 602, 604 and is generally identifiable as metadata. In this way, metadata 606 may be maintained through file conversions.

In some cases, converting the file type may alter how the metadata is stored or identified within the file 602, 604, but generally does not alter the metadata itself. The metadata 606 may be used to store any information relating to the input file 602 that may be useful for the universal file conversion system to be maintained across file conversions. The metadata 606 may be metadata originally in the input file 602 as it was received, or the metadata may include additional metadata added to the input file by the universal file conversion system.

Metadata 606 from the input file 602 may be used in file conversion. Some metadata fields may be used to determine the input file type, in place of or in addition to reading a file extension of the input file 602. Some metadata fields may determine, or help determine in conjunction with other data or analysis, a target file type to which to convert the input file 602. For example, a read-only attribute may indicate if the target file type should be editable or not, and thus selection of the target file type may be done to help enforce the read-only attribute.

Metadata 606 may further be used by the universal file conversion system for tracking a file 602, 604 that has been or will be converted through the system. For example, a unique identifier may be available, or stored in, the metadata 606 that can identify a file that has been converted through the system before. This may be useful for situations where a file name or other user-accessible identifier may be changed, but the file may still be related to previous versions of itself. Using the metadata 606 to track a file across potential changes may be useful in enabling automatic reconversion (autorecall in return conversions) as described herein. Further, in some cases, an input file may be provided multiple times to the universal file conversion system. For example, copies of the same file may be sent multiple times by email to a recipient. In such cases, it may be desirable to track each conversion of each copy of the input file, which may be done using the metadata 606 for each copy of the input file using a separate unique identifier, such as a transaction ID. Such a transaction ID may also be related to conversion records, such as may be found in a conversion history log as described herein.

Metadata 606 may further be used by the universal file conversion system for identifying an input (original) file type for a file that has been converted and is being returned to be converted back to the original file type (autorecall in return conversions). The metadata 606 may store the original input file type, as described herein. Further, the metadata 606 may store a previously determined sequence of file conversions for such returned files, which may be used to automatically convert the file back to the original input file type (autorecall in return conversions), as described herein.

Example 9—Delta File Conversion

Figure 7:
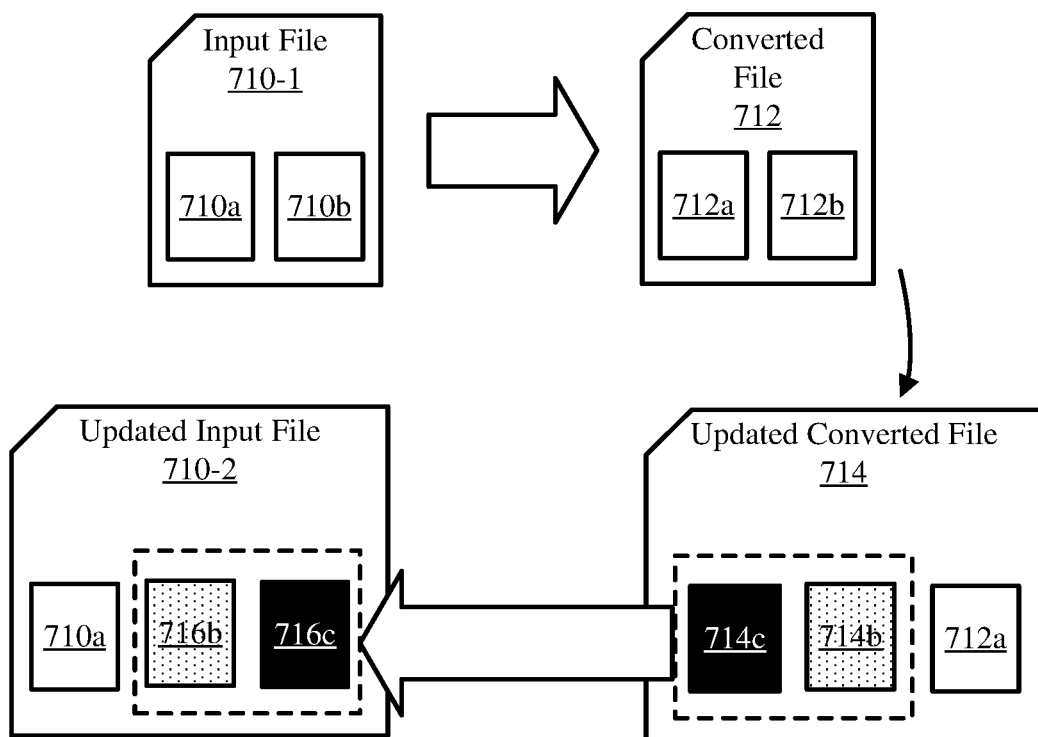
FIG. 7 is a diagram illustrating delta file conversion.

FIG. 7 illustrates delta file conversion. The universal file conversion system may perform delta file conversion when converting a file; this may be accomplished through the file delta conversion component (FDC) (such as the FDC 122 of FIG. 1), or the file delta conversion component in conjunction with the universal conversion engine 110 (or other components in the universal file conversion system), as shown in FIG. 1.

Delta file conversion may generally include identifying and converting specific portions of an input file, rather than converting the entire input file. Generally, file delta conversion may be used in return conversions of a file that has previously been converted, such as by the universal file conversion system. In some cases, changes can be identified by comparing a checksum or hash value of the original file (which can be stored in the file or in the universal file conversion system). If the checksum or hash value differ, the file can be analyzed in more detail to identify changed portions. Such more detailed analysis can include, for example, bit-wise, character-wise, or block-level comparison.

An input file 710-1 may have an input file type and one or more segments, or portions, of data, such as segment 710$a$ or 710$b$, which are formatted based on the input file type as they are part of the input file. The input file 710-1 may be converted to converted file 712 having a target file type different from the input file type of the input file. The converted file has data segments 712$a$ and 712$b$, which correspond to the data segments 710$a$ and 710$b$ respectively in the input file 710-1. The data segments 712$a$ and 712$b$ have the same data as data segments 710$a$ and 710$b$, but in the target file type.

Later, the converted file 712 may be updated, edited, or otherwise changed into updated converted file 714. Such updates are generally to data in the file 712 (and not to the file type), but may not be to all the data in the file. For example, data segment 712$a$ may be unchanged, and so data segment 712$a$ is also in the updated converted file 714. Other data segments may be changed, such as data segment 712$b$ may be updated to become data segment 714$b$ in the updated converted file 714. Further, additional or new data may be added, such as data segment 714$c$ in the updated converted file 714. Thus, the updated converted file 714 may have an unchanged data segment 712$a$, a changed data segment 714$b$, and a new data segment 714$c$, compared to with converted file 712 and the input file 710-1.

The updated converted file 714 may be converted back to the original input file type, as file conversion otherwise described herein. However, the updated converted file may alternatively be converted back to the original file type using delta file conversion. File delta conversion may include identifying the changed data segment 714$b$ and the new data segment 714$c$ in the updated converted file 714.

Once identified, the changed or new data segments 714$b$, 714$c$ may be converted to data segments 716$b$, 716$c$ having the original input file type, using file conversion as described herein. Once converted to the original input file type, the data segments 716$b$, 716$c$ may be inserted into the input file 710-1, creating updated input file 710-2. The insertion of data segment 716$c$ adds the data of that segment to the input file 710-1. The insertion of data segment 716$b$ overwrites the original corresponding data segment 710$b$ in the input file 710-1. Data segment 710$a$ remains unchanged between the input file 710-1 and the updated input file 710-2.

In some embodiments, converting the data segments 714$b$, 714$c$ to the data segments 716$b$, 716$c$ may include extracting the data segments from the updated converted file 714 and inserting the data segments into the corresponding locations in the input file 710-1 to form the updated input file 710-2 without actually converting the file type of those data segments. For example, data segments 714$b$, 714$c$ may be two separate texts paragraphs in a .rtf file 714. Extracting the text of those paragraphs and inserting the text into the .doc updated file 710-2 may be sufficient, without changing the file type of those specific paragraphs (such as, the paragraphs were strictly text with no special formatting that is different between the .rtf and the .doc files).

The identification of changed or new data segments may be performed by a compare routine available in a file delta conversion component or other component of the universal file conversion system (as shown in FIG. 1). Alternatively, the compare routine may be available in a program that supports the file types and is usable by the universal file conversion system, such as Microsoft WORD (Microsoft Corp., Redmond, Wash.) for .doc and .rtf formats. The compare routine may compare the converted file 712 and the updated converted file 714 based on the data in the files. Alternatively, the compare routine may compare the updated converted file 714 to the input file 710-1 if both files are available and the routine can support both file types. Alternatively, the updates in the updated converted file may be identified by metadata in the updated converted file that indicates updated or new data segments, such as a flag or other identifier field.

Example 10—Autorecall in Return Conversions

Figure 8A:
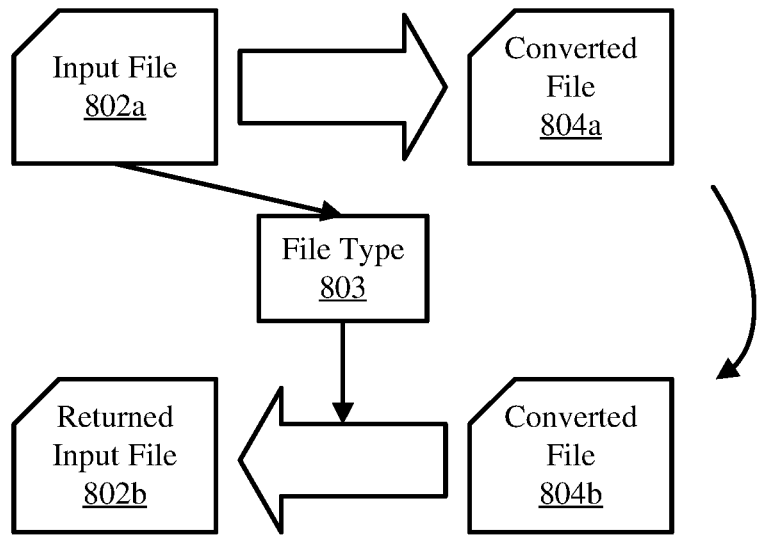
FIG. 8A is a diagram illustrating autorecall of the file type in file conversion and return conversion.

FIG. 8A is a diagram illustrating autorecall of the original file type in file conversion and return conversion. An input file 802a having an input file type may be converted to a converted file 804a having a target file type. The input file type may be stored as file type 803. This stored file type 803 may be stored in the metadata of the file 802a-b, 804a-b. The stored file type 803 may be stored in the universal file conversion system, such as in the conversion history log (as shown in FIG. 1 and described herein) in the record for this file conversion, or in a separate auto-recall table using a unique identifier.

The value stored in file type 803 may be a file type identifier, such as a file type extension. Alternatively, the stored file type 803 may be maintained in a manner specific to the mode of receipt or use of the input file 802a. For example, input file 802a may be an attachment to an email and converted file 804b may be an attachment to a reply to that email File type 803 may be retrieved from the input file 802a still attached to the originally received email, based on the connection between the original and reply email.

Later, the converted file 804a may become converted file 804b, both having the same target file type, but converted file 804b may have updates or changes as made to converted file 804a. Alternatively, converted file 804b may be the same as converted file 804a. The converted file 804b may be converted back to the input file type as returned input file 802b. The conversion to 802b may use the file type 803 as the target file type, rather than determining the target file type. In this way, the original file type may be automatically recalled when the file is converted back to the original file type.

Figure 8B:
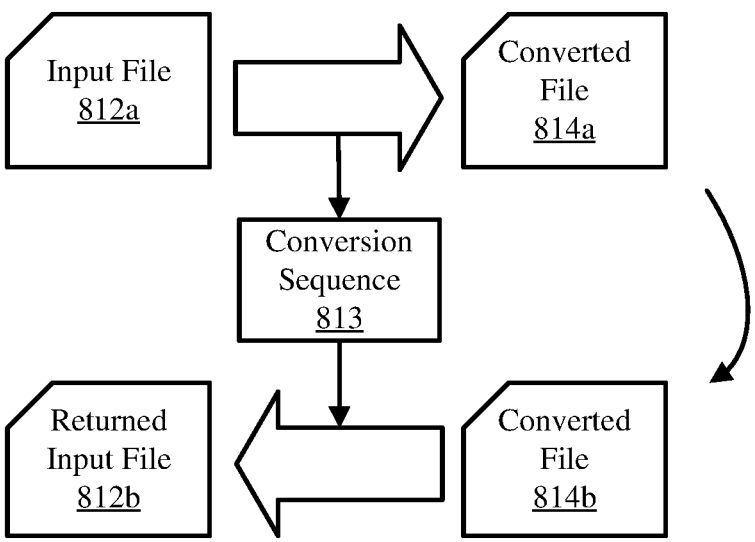
FIG. 8B is a diagram illustrating autorecall of the conversion sequence in file conversion and return conversion.

FIG. 8B is a diagram illustrating autorecall of the conversion sequence in file conversion and return conversion. An input file 812a having an input file type may be converted to a converted file 814a having a target file type, using a sequence of file conversions. The sequence of file conversions may be stored as conversion sequence 813. This stored conversion sequence 813 may be stored in the metadata of the file 812a-b, 814a-b. The stored conversion sequence 813 may be stored in the universal file conversion system, such as in the conversion history log (as shown in FIG. 1 and described herein) in the record for this file conversion, or in a separate auto-recall table using a unique identifier. The value stored in conversion sequence 813 may be an ordered set of conversion routine identifiers, such as in a string, a delimited string, an array, or other suitable variable.

Later, the converted file 814a may become converted file 814b, both having the same target file type, but converted file 814b may have updates or changes as made to converted file 814a. Alternatively, converted file 814b may be the same as converted file 814a. The converted file 814b may be converted back to the input file type as returned input file 812b. The conversion to 812b may use the conversion sequence 813 as the sequence of file conversions, rather than determining the sequence of file conversions. In this way, the original sequence of file conversions may be automatically recalled when the file is converted back to the original file type.

Example 11—Universal File Conversion System Environments

FIG. 9A is a schematic diagram depicting an application environment for a universal file conversion system. An application 902, such as a software application running in a computing environment, may have one or more plug-ins 903 (or add-ins or other software extensions to programs) that add or enhance functionality to the application. A universal file conversion system 904 may be integrated with the application 902, for example, as a plug-in. The universal file conversion system 904 may add functionality to the application 902 for automatically detecting and converting files accessed or received by the application. For example, the application 902 may be an email client, such as Microsoft OUTLOOK™ (Microsoft Corp., Redmond, Wash.) or Mozilla THUNDERBIRD™ (Mozilla Corp., Mountain View, Calif.), and the universal file conversion system may be integrated with the email client to automatically detect file attachments and convert the attached files to a format usable by the system or user on the system.

FIG. 9B is a schematic diagram depicting a system environment for a universal file conversion system 916. The universal file conversion system 916 may be integrated with a computer system 912. The computer system 912 may be an operating system and the universal file conversion system 916 is an application or service running in the operating system, or the universal file conversion system may be integrated within the operating system as a service or functionality provided through the operating system. The system 912 may be a central fileserver or other networked computer or file system. Additionally or alternatively, the universal file conversion system may communicate with and provide file conversion functionality, as described herein, to one or more applications, such as application 914, in the system 912.

FIG. 9C is a schematic diagram depicting a network environment 920 for a universal file conversion system 922. The universal file conversion system 922 may be available on a network 921, or integrated with a system (such as from FIG. 9B) on a network. Such a network 921 may be a cloud network or a local network. The universal file conversion system 922 may be available as a service to other systems on the network 922 or that have access to the network. For example, system 2 924 may be part of, or have access to, the network 921, and so can utilize file conversion functionality from the universal file conversion system 922. Additionally, system 1 926, which may be part of or have access to the network 921, may have one or more applications, such as application 928, that may utilize file conversion functionality from the universal file conversion system 922.

In these ways, the universal file conversion system may be integrated into an application, a system, or a network, to provide file conversion functionality as described herein.

Example 12—Additional File Conversion Processes

Figure 10A:
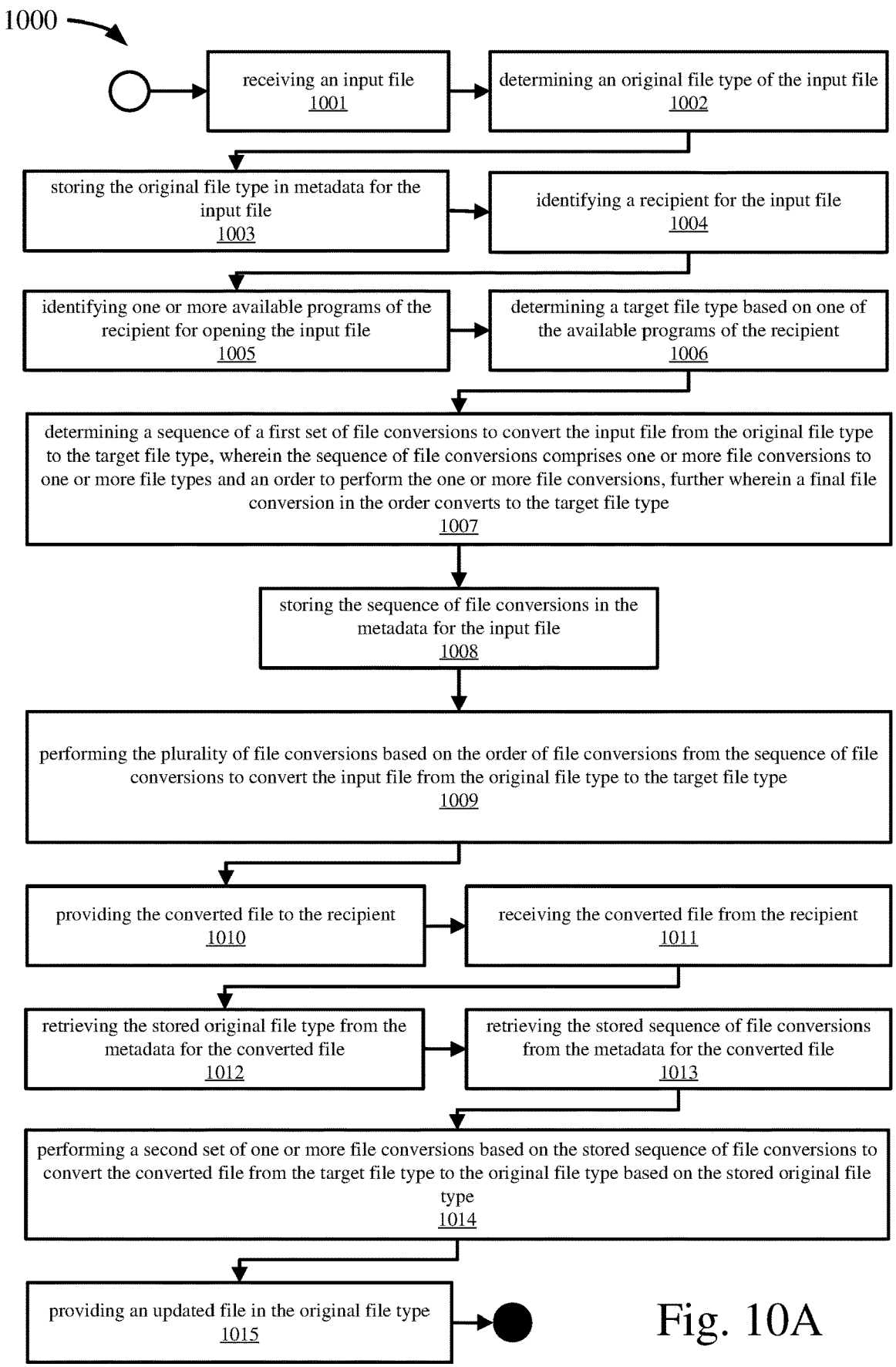
FIG. 10A is a flowchart illustrating a process for data file conversion.

FIG. 10A illustrates a process 1000 for data file conversion in a computer system. An input file may be received at 1001. An original file type of the input file may be determined at 1002. The original file type may be stored in metadata for the input file at 1003. A recipient for the input file may be identified at 1004.

One or more available programs of the recipient for opening the input file may be identified at 1005. A target file type based on at least one of the available programs of the recipient may be determined at 1006. A sequence of a first set of file conversions to convert the input file from the original file type to the target file type may be determined at 1007. The sequence of file conversions may include one or more file conversions to one or more file types and an order to perform the one or more file conversions and have a final file conversion in the order which converts to the target file type. The sequence of file conversions may be stored in the metadata for the input file at 1008.

The plurality of file conversions may be performed based on the order of file conversions from the sequence of file conversions to convert the input file from the original file type to the target file type at 1009. In at least some cases, the metadata of the input file may be maintained in the converted file. The converted file may be provided to the recipient at 1010.

The converted file may be received, such as from the recipient, at 1011. The stored original file type may be retrieved from the metadata for the converted file at 1012. The stored sequence of file conversions may be retrieved from the metadata for the converted file at 1013. A second set of one or more file conversions may be performed to convert the converted file from the target file type to the original file type based on the stored sequence of file conversions or the stored original file type at 1014. In some cases, the second set can be the same as the first set, and the conversions of the second set are performed in a reverse order as compared with the first set. An updated file in the original file type may be provided at 1015.

Figure 10B:
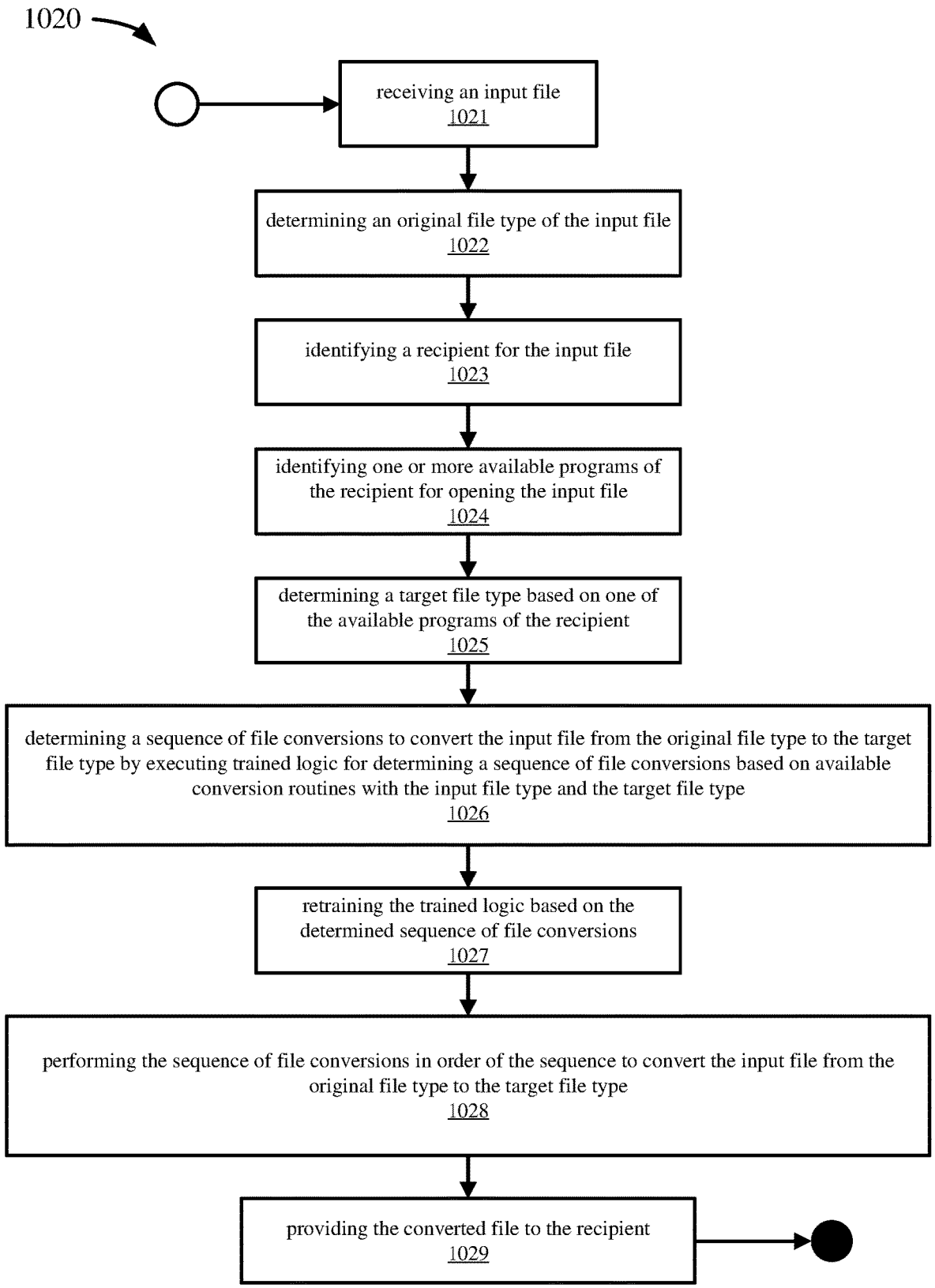
FIG. 10B is a flowchart illustrating another process for data file conversion.

FIG. 10B illustrates an additional process 1020 for data file conversion using one or more non-transitory computer-readable storage media storing computer-executable instructions for causing a computing system to perform a method for data file conversion. An input file may be received at 1021. An original file type of an input file may be determined at 1022. A recipient of an input file may be identified at 1023. One or more available programs of a recipient that may open the input file may be identified at 1024. A target file type based on at least one of the available programs of the recipient may be determined at 1025.

A sequence of file conversions to convert the input file from the original file type to the target file type via trained logic for determining a sequence of file conversions based on available conversion routines with the input file type and the target file type may be determined at 1026. The trained logic may be retrained based on the determined sequence of file conversions at 1027. The sequence of file conversions may be performed in order of the sequence to convert the input file from the original file type to the target file type at 1028. The converted file may be provided to the recipient at 1029.

Figure 10C:
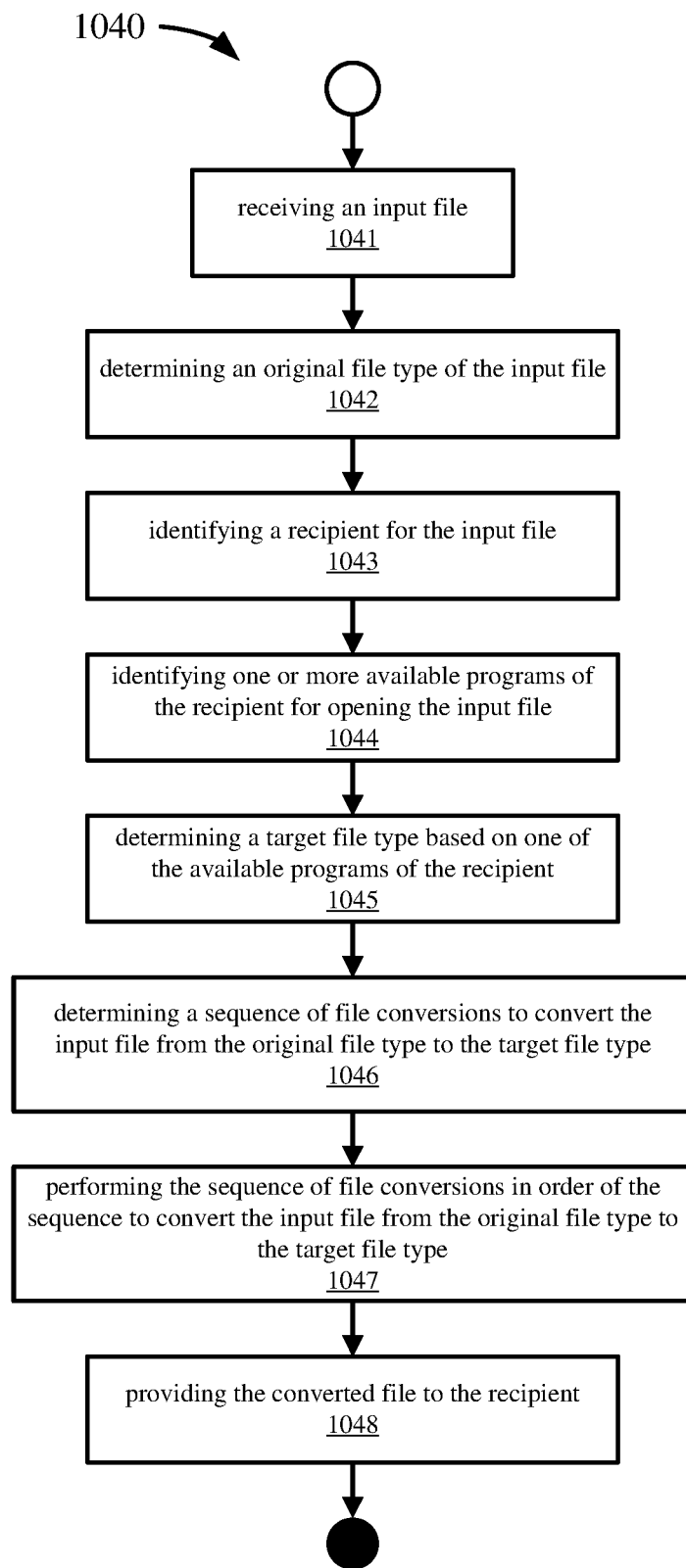
FIG. 10C is a flowchart illustrating a further process for data file conversion.

FIG. 10C illustrates a further process 1040 for data file conversion. A method 1040 may include receiving an input file at 1041. An original file type of the input file may be determined at 1042. A recipient for the input file may be identified at 1043. One or more available programs of the recipient for opening an input file may be identified at 1044. A target file type based on at least one of the available programs of the recipient may be determined at 1045. A sequence of file conversions to convert an input file from the original file type to a target file type may be determined at 1046. A sequence of file conversions may be performed in the order of the sequence to convert an input file from the original file type to the target file type at 1047. A converted file may be provided to the recipient at 1048.

Example 13—Computing Systems

Figure 11:
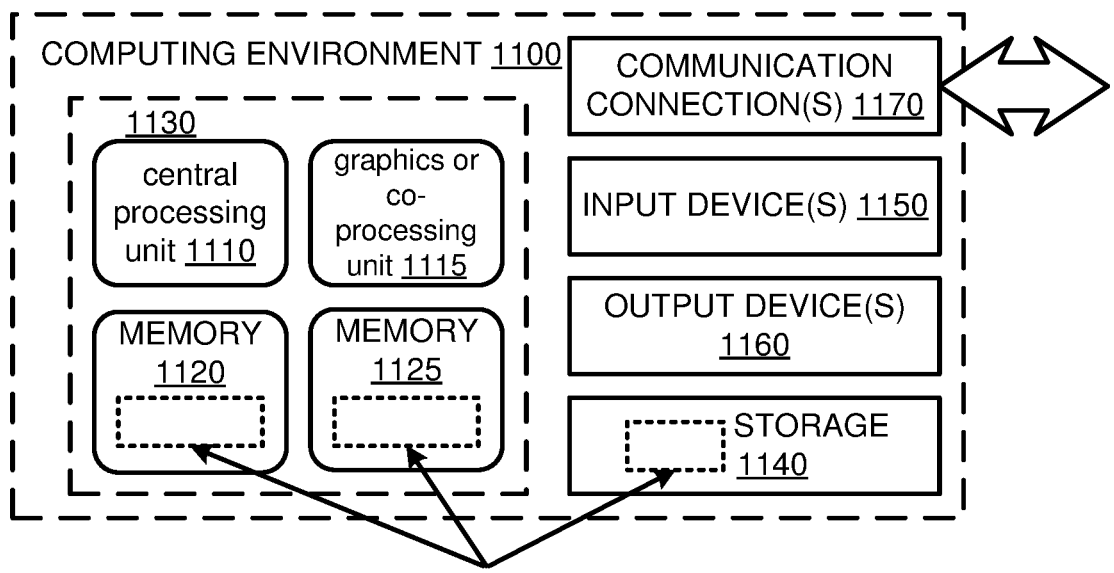
FIG. 11 is a diagram of an example computing system in which described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing components of the processes of FIG. 2 or 10A-C, or the systems of FIG. 1, 3, 5A-B, or 9A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115. The memory 1120, 1125, may also store settings or settings characteristics, such as for the central user repository (CUR) 130, the fileserver rule repository (FRR) 126, the conversion routine repository (CRR) 118, the conversion history log (CHL) 114, or other components as shown in FIG. 1 (and elsewhere), or the data shown in FIG. 3 or 5A-B.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 12:
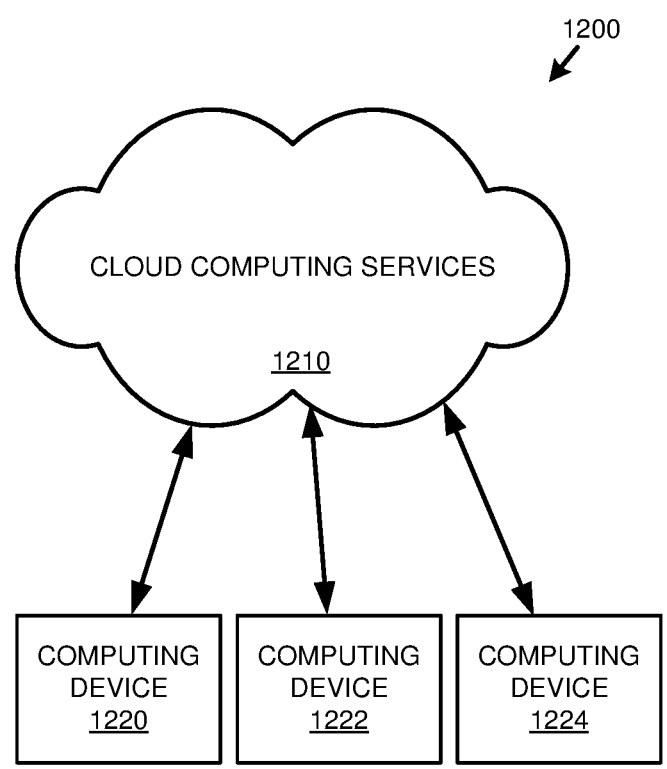
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computing system comprising:
one or more memories;
one or more hardware processing units coupled to the one or more memories; and
one or more computer readable storage media storing instructions that, when executed, cause the computing system to perform operations comprising:
  receiving an input file from a sender;
  determining an original file extension of the input file;
  identifying a recipient for the input file, wherein the recipient is different than the sender;
  determining a first set of one or more programs available to the recipient on a recipient computing device;
  determining a second set of one or more file extensions that at least one of the one or more programs of the first set is configured to open;
  determining that the input file is not openable by any of the one or more programs of the first set available to the recipient on the recipient computing device by determining that the original file extension of the input file does not match any of the one or more file extensions of the second set that at least one of the one or more programs of the first set is configured to open;
  in response to the determining that the input file is not openable by any of the one or more programs of the first set, determining a third set of one or more file extensions of the second set of one or more file extensions to which the input file extension is convertible;
  in response to the determining that the input file is not openable by any of the one or more programs of the first set, determining a target file extension from the third set;
  in response to the determining that the input file is not openable by any of the one or more programs of the first set, converting the original file extension to an output file having the target file extension, the converting the original file extension comprising, based at least on conversion routines available in a conversion routine library, determining a sequence of one or more of the file conversion routines to convert the original file extension to the output file having the output file extension; and
  after the converting, making the output file available to the recipient on the recipient computing device.

2. The computing system of claim 1, the operations further comprising:
sending a request to the recipient for programs available to the recipient; and
receiving a response to the request from the recipient, the response comprising the first set.

3. The computing system of claim 1, the operations further comprising:
receiving input from the recipient providing the first set.

4. The computing system of claim 1, the operations further comprising:
storing the first set in association with an identifier for the recipient.

5. The computing system of claim 1, the operations further comprising:
generating a unique identifier for the target file, wherein the unique identifier is different than a name of the target file; and
storing the unique identifier in the target file.

6. The computing system of claim 5, the operations further comprising:
receiving a file from the recipient;
determining that the file comprises the unique identifier;
based on the determining that the file comprises the unique identifier, determining that the file corresponds to the target file; and
based on the determining that the file corresponds to the target file, converting the extension of the target file to the input file extension.

7. The computing system of claim 6, the operations further comprising:
retrieving a stored sequence of file conversion routines used to convert the original file extension to the target file extension;
wherein the converting the extension of the file to the input file extension comprises applying the stored sequence of file conversion in reverse as compared with the converting the original file extension to an output file having the target file extension.

8. The computing system of claim 6, the operations further comprising:

retrieving a stored sequence of file conversion routines used to convert the original file extension to the target file extension;

determining that converting at least a portion of the file to the input file extension by applying the stored sequence of file conversions in reverse as compared with the converting the original file extension to an output file having the target file extension would result in a converted file of higher conversion loss; and determining an alternative sequence of one or more file conversion routines to convert the file to the input file extension with lower conversion loss.

9. The computing system of claim 8, the operations further comprising:

determining differences between the file and the target file, wherein the converting at least a portion of the file to the input file extension comprises converting the differences to the input file extension to result in converted differences;

applying the converted differences to the input file to result in a modified input file; and storing the modified input file.

10. The computing system of claim 8, wherein portions of the file that are not part of the differences are not converted to the input file extension or applied to the input file.

11. The computing system of claim 1, the operations further comprising:

receiving a file from the recipient;

determining that the file corresponds to the target file; and based on the determining that the file corresponds to the target file, converting at least a portion of the file to the input file extension.

12. The computing system of claim 1, the operations further comprising:

determining an operation type for the recipient with respect to the input file, wherein determining a target file extension from the third set is based at least on the operation type.

13. The computing system of claim 12, wherein: (1) the operation type is a read-only and a first file extension of the third set is selected as the target file extension; or (2) the operation type is configured for user modification of the output file and a second file extension of the third set is selected as the target file extension, the second file extension being different than the first file extension.

14. The computing system of claim 1, wherein determining a target file extension from the third set is based at least on conversion loss differences between at least two target file extensions of the third set.

15. The computing system of claim 1, wherein the sequence is a first sequence, the operations further comprising:

based at least on conversion routines available in the conversion routine library, determining a second sequence of one or more of the file conversion routines to convert the original file extension to the output file having the output file extension, wherein at least a portion of the file conversion routines, or a sequence in which file conversion routines are applied, differ between the first sequence and the second sequence.

16. The computing system of claim 15, the operations further comprising:

selecting the first sequence over the second sequence based at least on stored previous selections of the recipient.

17. The computing system of claim 15, the operations further comprising:

selecting the first sequence over the second sequence based at least on conversion quality differences between an output of the first sequence and an output of the second sequence.

18. A method, implementing by a computing system comprising at least one hardware processor and at least one memory, the method comprising:

receiving an input file from a sender;

determining an original file extension of the input file;

identifying a recipient for the input file, wherein the recipient is different than the sender;

determining a first set of one or more programs available to the recipient on a recipient computing device;

determining a second set of one or more file extensions that at least one of the one or more programs of the first set is configured to open;

determining that the input file is not openable by any of the one or more programs of the first set available to the recipient on the recipient computing device by determining that the original file extension of the input file does not match any of the one or more file extensions of the second set that at least one of the one or more programs of the first set is configured to open;

in response to the determining that the input file is not openable by any of the one or more programs of the first set, determining a third set of one or more file extensions of the second set of one or more file extensions to which the input file extension is convertible;

in response to the determining that the input file is not openable by any of the one or more programs of the first set, determining a target file extension from the third set;

in response to the determining that the input file is not openable by any of the one or more programs of the first set, converting the original file extension to an output file having the target file extension, the converting the original file extension comprising, based at least on conversion routines available in a conversion routine library, determining a sequence of one or more of the file conversion routines to convert the original file extension to the output file having the output file extension; and after the converting, making the output file available to the recipient on the recipient computing device.

19. The method of claim 18, further comprising:

generating a unique identifier for the target file, wherein the unique identifier is different than a name of the target file;

storing the unique identifier in the target file;

receiving a file from the recipient;

determining that the file comprises the unique identifier;

based on the determining that the file comprises the unique identifier, determining that the file corresponds to the target file;

based on the determining that the file corresponds to the target file, converting the extension of the target file to the input file extension;

retrieving a stored sequence of file conversion routines used to convert the original file extension to the target file extension;

determining that converting at least a portion of the file to the input file extension by applying the stored sequence of file conversions in reverse as compared with the converting the original file extension to an output file having the target file extension would result in a converted file of higher conversion loss; and determining an alternative sequence of one or more file conversion routines to convert the file to the input file extension with lower conversion loss.

20. One or more computer-readable storage media comprising:
   computer-executable instructions that, when executed by a computing device comprising at least one hardware processor and a memory, cause the computing device to receive an input file from a sender;
   computer-executable instructions that, when executed by the computing device, cause the computing device to determine an original file extension of the input file;
   computer-executable instructions that, when executed by the computing device, cause the computing device to identify a recipient for the input file, wherein the recipient is different than the sender;
   computer-executable instructions that, when executed by the computing device, cause the computing device to determine a first set of one or more programs available to the recipient on a recipient computing device;
   computer-executable instructions that, when executed by the computing device, cause the computing device to determine a second set of one or more file extensions that at least one of the one or more programs of the first set is configured to open;
   computer-executable instructions that, when executed by the computing device, cause the computing device to determine that the input file is not openable by any of the one or more programs of the first set available to the recipient on the recipient computing device by determining that the original file extension of the input file does not match any of the one or more file extensions of the second set that at least one of the one or more programs of the first set is configured to open;
   computer-executable instructions that, when executed by the computing device, cause the computing device to, in response to the determining that the input file is not openable by any of the one or more programs of the first set, determine a third set of one or more file extensions of the second set of one or more file extensions to which the input file extension is convertible;
   computer-executable instructions that, when executed by the computing device, cause the computing device to, in response to the determining that the input file is not openable by any of the one or more programs of the first set, determine a target file extension from the third set;
   computer-executable instructions that, when executed by the computing device, cause the computing device to, in response to the determining that the input file is not openable by any of the one or more programs of the first set, convert the original file extension to an output file having the target file extension, the computer-executable instructions that cause the computing device to convert the original file extension comprising computer-executable instructions that cause the computing device to, based at least on conversion routines available in a conversion routine library, determine a sequence of one or more of the file conversion routines to convert the original file extension to the output file having the output file extension; and
   computer-executable instructions that, when executed by the computing device, cause the computing device to, after the converting, make the output file available to the recipient on the recipient computing device.

* * * * *